US007730732B2

(12) United States Patent
Kaga et al.

(10) Patent No.: US 7,730,732 B2
(45) Date of Patent: Jun. 8, 2010

(54) REFRIGERATING STORAGE CABINET

(75) Inventors: Shinichi Kaga, Toyoake (JP); Akihiko Hirano, Toyoake (JP)

(73) Assignee: Hoshizaki Denki Co., Ltd., Aichi (JP)

( * ) Notice: Subject to any disclaimer, the term of this patent is extended or adjusted under 35 U.S.C. 154(b) by 762 days.

(21) Appl. No.: 10/575,716

(22) PCT Filed: Oct. 20, 2004

(86) PCT No.: PCT/JP2004/015524

§ 371 (c)(1), (2), (4) Date: Apr. 13, 2006

(87) PCT Pub. No.: WO2005/038365

PCT Pub. Date: Apr. 28, 2005

(65) Prior Publication Data

US 2007/0144188 A1 Jun. 28, 2007

(30) Foreign Application Priority Data

Oct. 20, 2003 (JP) ............................ 2003-359715

(51) Int. Cl.
*F25B 49/00* (2006.01)
*G05D 23/12* (2006.01)

(52) U.S. Cl. ......................... 62/228.4; 62/229; 62/157; 62/231; 236/1 C

(58) Field of Classification Search .................. 62/229, 62/157, 28.42, 228.4
See application file for complete search history.

(56) References Cited

U.S. PATENT DOCUMENTS 2,231,069 A * 2/1941 Harris ......................... 62/215
2,801,799 A * 8/1957 McColloch ............... 236/46 R
3,204,423 A * 9/1965 Resh, Jr. ...................... 62/209
3,747,361 A * 7/1973 Harbour ...................... 62/157
4,328,680 A * 5/1982 Stamp et al. .................. 62/155

(Continued)

FOREIGN PATENT DOCUMENTS

JP 10-9739 1/1998

(Continued)

OTHER PUBLICATIONS

Supplementary European Search Report issued May 26, 2008 in European Application No. 04 79 2690.

*Primary Examiner*—Frantz F. Jules
*Assistant Examiner*—Alexis K Cox
(74) *Attorney, Agent, or Firm*—Wenderoth, Lind & Ponack L.L.P.

(57) ABSTRACT

A storing section stores data of a pull down cooling characteristic indicative of a time-varying mode of reduction in a target temperature drop. For example, when this is a linear function line, a target internal temperature drop degree takes a constant value, irrespective of an operating time. An actual temperature drop degree is computed on the basis of the detected internal temperature. The computed value is compared with a target value read from the storing section. When the computed value is less than the target value, a rotational speed of an inverter compressor is increased via an inverter circuit. When the computed value is larger than the target value, the rotational speed of the compressor is decreased. The speed increases and decreases are repeated so that pull down cooling is performed along the linear line.

12 Claims, 26 Drawing Sheets

U.S. PATENT DOCUMENTS

| | | | | |
|---|---|---|---|---|
| 4,662,185 | A * | 5/1987 | Kobayashi et al. | 62/228.4 |
| 4,903,502 | A * | 2/1990 | Hanson et al. | 62/228.5 |
| 4,959,969 | A * | 10/1990 | Okamoto et al. | 62/157 |
| 5,460,009 | A | 10/1995 | Wills et al. | |
| 5,555,736 | A | 9/1996 | Wills et al. | |
| 5,566,879 | A * | 10/1996 | Longtin | 236/46 R |
| 5,592,058 | A * | 1/1997 | Archer et al. | 318/400.09 |
| 6,216,478 | B1 | 4/2001 | Kang | |
| 6,931,872 | B2 * | 8/2005 | Kaga et al. | 62/228.4 |
| 7,442,012 | B2 * | 10/2008 | Moens | 417/32 |
| 2002/0116936 | A1 * | 8/2002 | Cartwright et al. | 62/157 |
| 2003/0070438 | A1 * | 4/2003 | Kikuchi et al. | 62/141 |
| 2003/0182957 | A1 | 10/2003 | Hu et al. | |
| 2008/0295531 | A1 * | 12/2008 | Song et al. | 62/157 |
| 2009/0171512 | A1 * | 7/2009 | Duncan | 700/300 |
| 2009/0216379 | A1 * | 8/2009 | Smith | 700/275 |

FOREIGN PATENT DOCUMENTS

| | | |
|---|---|---|
| JP | 2000-205723 | 7/2000 |
| JP | 2002-13858 | 1/2002 |
| JP | 2002-195719 | 7/2002 |
| WO | 03/025480 | 3/2003 |

* cited by examiner

Fig. 14

| INTERNAL TEMPERATURE (°C) | TARGET TEMPERATURE DROP DEGREE Ap2 (ΔT/Δt) |
|---|---|
| 30 | ......... |
| ... | ......... |
| ... | ......... |
| ⋮ | ⋮ |

Fig. 16

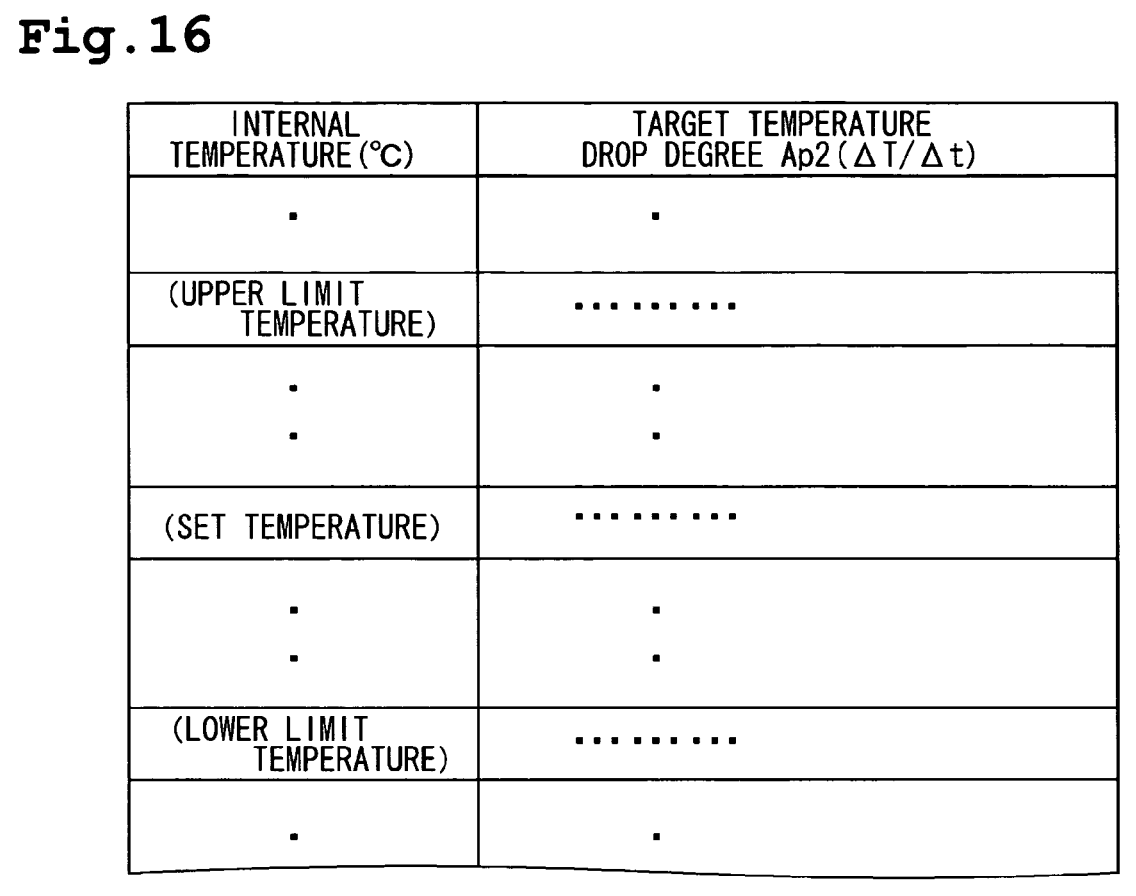

| INTERNAL TEMPERATURE (°C) | TARGET TEMPERATURE DROP DEGREE Ap2 (ΔT/Δt) |
|---|---|
| . | . |
| (UPPER LIMIT TEMPERATURE) | ......... |
| . . | . . |
| (SET TEMPERATURE) | ......... |
| . . | . . |
| (LOWER LIMIT TEMPERATURE) | ......... |
| . | . |

REFRIGERATING STORAGE CABINET

BACKGROUND OF THE INVENTION

1. Field of the Invention

The present invention relates to a refrigerating storage cabinet, and more particularly, to a refrigerating storage cabinet with an improved control of refrigerating operation.

2. Description of the Related Art

Refrigerators for commercial use have recently been provided with an inverter compressor so that the refrigerating performance is adjusted according to the load See JP-A-2002-195719, for example).

Refrigerators provided with an inverter compressor of this type carry out their highest allowable speed operation in pull down cooling. However, large, middle, and small heat insulating housings present clear differences among the internal temperatures when pull down cooling is performed under identical conditions in which food is not accommodated in the compartments, as shown in FIG. 26. The reason for this is that the difference in the degree of temperature drop is proportional to the surface area of the heat insulating housing, when the difference in the internal and external temperatures is the same. In addition, the heat capacity of an internal wall material or rack is significant as the box becomes larger.

SUMMARY OF THE INVENTION

Greater importance is placed on the temperature characteristic of pull down refrigeration in commercial use refrigerators-freezers. For example, refrigeration starting from a high internal temperature, such as 20° C., is substantially limited to an initial operation after installation, re-operation several times after turning the power off for maintenance, several minutes of door opening to insert food materials, or the accommodation of hot food. In the refrigerators-freezers for commercial use, doors are frequently opened and closed so that food materials can be placed into and taken out of compartments where the ambient temperature is relatively higher. In view of these reasons, it should be taken into sufficient consideration that the internal temperature easily rises. Accordingly, a temperature drop characteristic should be considered as a returning force in the internal temperature rise.

Accordingly, a performance test for pull down refrigeration is compulsory. However, the performance test needs to be conducted with the refrigeration units having been assembled to the heat insulating housings. As a result, there is a problem of inconvenience and complication, such as the problem in which the places where and the times when a test should be conducted are limited.

The present invention was made in view of the foregoing circumstances, and an object thereof is to be able to refrigerate the inner atmosphere according to a predetermined refrigeration characteristic.

As a means for achieving the above object, the invention according to a first aspect comprises a refrigerating storage cabinet for refrigerating an inner atmosphere that includes a refrigeration unit comprising a compressor and an evaporator. The refrigerating storage cabinet comprises a storing means for storing a cooling characteristic comprising a target physical amount as a function of operating time. A physical amount sensor is able to detect a physical amount corresponding to the target physical amount at predetermined intervals of operating time. The compressor has a plurality of performance levels, and an operation control means controls the compressor by selecting an appropriate one of the plurality of performance levels based upon a relationship between the physical amount and the target physical amount for corresponding operating time.

In accordance with a second aspect of the present invention, the physical amount and the target physical amount are temperatures. The physical amount is the temperature of the inner atmosphere. The compressor is controlled by the operation control means in which the cooling characteristic is a pull down characteristic, while the physical amount is in a temperature range from above a high temperature to near a set temperature. The high temperature is higher than the set temperature by more than a predetermined value.

According to a third aspect of the invention, an upper limit temperature is higher by the predetermined value than a set temperature. A lower limit temperature is lower by the predetermined value than the set temperature. A control-cooling zone is between and includes the upper limit temperature to the lower limit temperature. When the physical amount is in the control-cooling zone, the cooling characteristic is a control-cooling characteristic. The compressor is controlled by the operation control means, the control characteristic being a control-cooling characteristic when the physical amount is in the control-cooling zone from the upper limit temperature to the lower limit temperature. When the physical amount reaches the lower limit temperature from a temperature higher than the lower limit temperature, the compressor is not operated. When the physical amount reaches the upper limit temperature from a temperature lower than the upper limit temperature, the compressor is operationally controlled by the operation control means.

According to a fourth aspect of the invention, the compressor is a speed-controllable inverter compressor. The operation control means comprises a physical amount change computing section computing a physical amount reduction degree at the predetermined intervals of operating time, a target physical amount reduction degree output section providing a target physical amount reduction degree corresponding to the predetermined intervals of operating time, a comparing section for comparing the physical amount reduction degree to the target physical amount reduction degree at a corresponding operation time, and a speed controlling section controlling the inverter compressor so that a rotational speed of the inverter compressor is increased when the comparing section indicates that the physical amount reduction degree is smaller than the target physical amount reduction degree. The rotational speed of the inverter compressor is decreased when the comparing section indicates that the actual physical amount reduction degree is larger than the target physical amount reduction degree.

According to a fifth aspect of the present invention, the pull down characteristic is a linear function. The target physical amount reduction degree is a constant value, further.

According to a sixth aspect of the invention, the control-cooling characteristic is a linear function and the target physical amount reduction degree is a constant value.

According to a seventh aspect of the invention, the control-cooling characteristic is a linear function.

According to an eighth aspect of the invention, the control-cooling characteristic is a quadratic function, and the pull down characteristic is a quadratic function.

According to a ninth aspect of the invention, the control-cooling characteristic is represented as an exponential function, and the pull down characteristic is an exponential function.

According to a tenth aspect of the invention, a reference table is provided in which the target physical amount reduction degrees have been determined for a plurality of target physical amounts and stored in the reference table according to an associated target physical amount. An appropriate target physical amount reduction degree is retrieved by the target physical amount reduction degree output section from the target reduction table based on a correspondence between the physical amount and the associated target physical amount. A physical amount change computing section computes a physical amount reduction degree for the physical amount based on the physical amount and a previously measured physical amount. A physical amount reduction degree and the appropriate target physical amount reduction degree are used as inputs for the comparing section.

According to an eleventh aspect of the invention, the pull down cooling zone includes a first pull down zone and a second pull down zone. The pull down characteristic includes a first pull down characteristic and a second pull down characteristic. The first pull down characteristic is used for the first pull down zone and is a linear function, wherein the second pull down characteristic is used for the second pull down part and is a quadratic function.

According to a twelfth aspect of the invention, the storing means stores a plurality of the cooling characteristics, and the operation control means executes an appropriate one of the cooling characteristics based upon the physical amount.

According to a thirteenth aspect of the invention, a plurality of the pull down cooling characteristics is provided, and an appropriate one of the plurality of the pull down cooling characteristics is executed based on the physical amount.

According to a fourteenth aspect of the invention, the appropriate one of the plurality of the pull down cooling characteristics is executed based upon a zone of the physical amount.

According a fifteenth aspect of the invention, the appropriate one of the plurality of the pull down cooling characteristics includes a small temperature drop degree when a difference between the physical amount and the target physical amount is less than a predetermined value. The appropriate one of the plurality of the pull down characteristics includes a large temperature drop degree when the difference between the physical amount and the target physical amount is greater than or equal to the predetermined amount.

According to a sixteenth aspect of the invention, the plurality of the pull down cooling characteristics includes an auxiliary cooling characteristic comprising a temperature curve in which a convergence temperature remains at a temperature higher by an auxiliary predetermined value than the set internal temperature. The auxiliary cooling characteristic is selected as the appropriate one of the plurality of the pull down cooling characteristics when a difference between the physical amount and an evaporation temperature of the evaporator is at or above a predetermined auxiliary temperature value or when the physical amount is higher than the target physical amount by a predetermined auxiliary temperature value.

According to a seventeenth aspect of the invention, a refrigerating storage cabinet for refrigerating an inner atmosphere includes a refrigeration unit which comprises a compressor and an evaporator. The refrigerating storage cabinet comprises a storing means for storing a plurality of cooling characteristics comprising a target physical amount as a function of operating time and a physical amount sensor able to detect a physical amount corresponding to the target physical amount at predetermined intervals of operating time. The compressor comprises a plurality of performance levels. An operation control means controls the compressor by selecting an appropriate one of the plurality of performance levels based upon a relationship between the physical amount and the target physical amount for a corresponding operating time. The operation control means selects an appropriate one of the plurality of cooling characteristics based upon the physical amount. The target physical amount is determined from the appropriate one of the plurality of cooling characteristics.

According to an eighteenth aspect of the invention, the physical amount and the target physical amount are temperatures. The physical amount is the temperature of the inner atmosphere, further. The compressor is controlled by the operation control means in which the cooling characteristic is a pull down characteristic while the physical amount is in a temperature range from above a high temperature to near a set temperature. The high temperature is higher than the set temperature by more than a predetermined value. An upper limit temperature is higher by the predetermined value than a set temperature. A lower limit temperature is lower by the predetermined value than the set temperature. A control-cooling zone is provided between and including the upper limit temperature to the lower limit temperature. When the physical amount is in the control-cooling zone, the cooling characteristic is a control-cooling characteristic. The compressor is controlled by the operation control means wherein the control characteristic is a control-cooling characteristic when the physical amount is in the control-cooling zone from the upper limit temperature to the lower limit temperature. When the physical amount reaches the lower limit temperature from a temperature higher than the lower limit temperature, the compressor is not operated. When the physical amount reaches the upper limit temperature from a temperature lower than the upper limit temperature, the compressor is operationally controlled by the operation control means.

The storing means has previously stored data of a cooling characteristic indicative of a time-varying mode of reduction in a target physical amount. In refrigerating operation, the cooling characteristic is read from the storing means or unit. The performance of the compressor is controlled so that a physical amount detected by the physical amount sensor is reduced following the cooling characteristic read from the storage means.

More specifically, the inner atmosphere is refrigerated according to a predetermined cooling characteristic irrespective of the conditions such as the capacity of the heat insulating housing. The cooling characteristic is optionally settable with a wide range such as one in which a reduction in the physical amount changes from moment to moment.

The inner temperature rises to a large extent with the opening of the door. With regard to pull down cooling reducing the raised temperature to a set temperature, a pull down cooling characteristic is previously stored that is indicative of a time-varying mode of the reduction in a target physical amount. The performance of the compressor is controlled so that the corresponding physical amount is reduced following the pull down cooling characteristic.

In other words, pull down cooling is performed according to a predetermined pull down cooling characteristic, irrespective of conditions such as the capacity of the heat insulating housing. Accordingly, the performance test in pull down cooling has no relation with an actually used heat insulating housing to which the refrigeration unit is attached. For example, a test heat insulating housing can be used for the performance test. Consequently, the degree of freedom in the place and time of the performance test can be increased to a large extent.

The performance of the compressor is controlled so that the corresponding physical amount is reduced following the control-cooling characteristic during the operation of the compressor in control-cooling. When the control-cooling characteristic is set at a gentle gradient, the cooling can be carried out while the compressor is in low performance operation, namely, while energy savings are achieved. On the other hand, when the control-cooling characteristic is suitably set at a lower limit temperature, the operation of the compressor can reliably be stopped, whereby a defrosting operation is performed in the evaporator. Accordingly, a large amount of frost can be prevented.

In the cooling operation, an actual physical amount reduction degree is obtained on the basis of the detected physical amount, while a target physical amount is produced from the data of the cooling characteristic. The inverter compressor is controlled so that the speed of the inverter compressor is increased when the actual physical amount reduction degree is less than the target physical amount reduction degree. In a contrary case, the inverter compressor is controlled so that the speed of the inverter compressor is decreased or the inverter compressor is stopped. The control is repeated so that the inner atmosphere is cooled according to the predetermined cooling characteristic.

Since the target physical amount reduction degree is constant irrespective of a lapse of time, calculation is not required. Accordingly, the control system can be simplified.

The cooling characteristic is represented as a quadratic function involving a physical amount and time. A target physical amount reduction degree is computed from the quadratic function as an amount of reduction in the physical amount per unit of time at every sampling time. For example, a temperature drop characteristic that has had real accomplishments in the market and has earned a fine reputation from its users can be used as the target temperature drop characteristic in pull down cooling.

The refrigerating characteristic is represented as an exponential function involving a physical amount and time. A target physical amount reduction degree is computed from the exponential function as an amount of reduction in the physical amount per unit of time at every sampling time. For example, when the temperature in the heat insulating housing drops due to heat radiation, in many cases the temperature change is approximated by the curve of an exponential function. Consequently, a temperature drop characteristic can be used in keeping with the actual temperature drop. The target physical amount reduction degree corresponding to a current physical amount is retrieved from the reference table at every sampling time. A physical amount reduction characteristic of an approximate quadratic function is applicable. A target physical amount reduction degree is obtained only by referring to the reference table and no calculation is required. Consequently, the control speed can be increased.

For example, in a refrigerator with a set internal temperature of 3° C., it is rare that the internal temperature rises to 15° C. or 20° C., even though the door is frequently opened and closed or a large amount of warm food material is placed within the refrigerator. It is the zone at or lower than 20° C. or 15° C. that requires a returning force. In this zone, rapid refrigeration following a pull down cooling characteristic of a quadratic function is desirable. However, when a quadratic function is applied to a zone at or higher than 20° C. or 15° C. (first half of the pull down cooling), a large cooling performance is required. Accordingly, an inverter compressor able to cope with high-speed rotation or an evaporator with a large capacity is required. In other words, in order to cope with the first half of pull down cooling, which has a low frequency of occurrence and is less important, providing the above inverter compressor or evaporator is nearly excessive.

In the invention, a linear function is applied to the pull down cooling characteristic in the first half of pull down cooling. A quadratic or approximate exponential function is applied to the pull down cooling characteristic in the second half of pull down cooling. In the case where a linear function is followed, the rotational speed of the inverter compressor is initially low and is gradually increased. Accordingly, an inverter compressor able to cope with unnecessary high-speed rotation or an evaporator with a high heat-radiating performance is not provided. On the other hand, rapid refrigeration can be realized in a second half of pull down cooling requiring an internal temperature returning force.

For example, when pull down cooling is actually used in a refrigerating storage cabinet, the conditions of use may have large variations, e.g. an extremely large opening-closing frequency or conversely, the door is almost never opened or closed. Accordingly, a plurality of programs having different pull down cooling characteristics is prepared and selectively executed. Consequently, optimum cooling can be performed that meets the conditions of use.

A plurality of pull down cooling characteristics is provided having different change modes for the physical amount. Each pull down cooling characteristic is selectively read and executed.

In the case where pull down cooling is performed for a freezer, when the internal temperature is very high, refrigeration is suitable in which the temperature drop is gentle. When the internal temperature has dropped to some extent, refrigeration causing a large temperature drop is desirable in order to prevent the deterioration of the food material. Furthermore, for the freezing temperature zone (0° C. to −5° C.), the quality of frozen food, such as meat or fish, is improved when the freezing temperature zone (0° C. to −5° C.) is passed as early as possible.

A plurality of target cooling characteristics is provided in pull down cooling. A suitable one of the target cooling characteristics is selected according to the temperature zone in the interior. Consequently, optimum temperature control is possible over the entire zone of pull down cooling.

For example, during operation in the control refrigeration zone, the door is frequently opened and closed or warm food is placed into the refrigerating storage cabinet, whereupon the internal temperature rises to a large degree. In this case, the refrigerating storage cabinet proceeds to an operation that conforms to a pull down cooling characteristic with a large temperature drop. When the difference between the internal temperature and the set temperature is at or below a predetermined value, a normal pull down cooling characteristic is selected with a relatively smaller temperature drop degree. When the difference exceeds the predetermined value, a pull down cooling characteristic having a relatively larger temperature drop degree is selected. The above is effective when a rapid temperature return is performed in a case where the internal temperature is outside of the control-cooling zone.

The heat-exchange characteristic is deteriorated when an amount of frost formation is on the evaporator. When the operation is continued following a target-cooling characteristic, the rotational speed of the compressor needs to be increased, resulting in a waste of power. In view of this, when the difference between the internal temperature and the evaporation temperature is at or below a predetermined value, an auxiliary cooling characteristic is selected as the pull down cooling characteristic to be followed. The auxiliary cooling characteristic has a temperature curve in which a convergence temperature remains at a temperature that is higher by a predetermined value than the set internal temperature. More specifically, the above is effective for achieving energy savings without excessive cooling, and also for preventing frost formation.

Furthermore, when the internal temperature is apart by a predetermined value from the set temperature without following the target-cooling characteristic, the above-described auxiliary cooling characteristic is selected. Thus, this control manner can be used as emergency measure.

When the pull down cooling zone is changed to the control-cooling zone, the compressor is continuously controlled so as to follow the pull down cooling characteristic. When the internal temperature has dropped to the set temperature, the performance of the compressor is lowered, whereby the internal temperature gradually drops at a gentler gradient. Thereafter, when the internal temperature has reached the lower limit temperature, the compressor is stopped.

In the control-cooling zone, the internal temperature is rapidly decreased to the set temperature following pull down cooling. Accordingly, even when the compressor is thereafter operated at a lower performance level for energy savings, the internal temperature is decreased to the lower limit temperature in a suitable time so that the compressor can be stopped. A defrosting operation is carried out in the evaporator, thereby preventing the formation of a large amount of frost.

When the load or the like raises the internal temperature, which was currently being decreased from the set temperature to the lower limit temperature, it takes a large amount of time to drop the internal temperature to the lower limit temperature thereafter. Accordingly, the compressor is continuously operated for a long period of time. In view of this, the performance of the compressor is increased when the internal temperature starts to rise, so that the internal temperature falls again to the lower limit temperature. Consequently, the compressor can be reliably stopped at a suitable time.

BRIEF DESCRIPTION OF THE DRAWINGS

FIG. 14 A figure showing a reference table based on a pull down cooling characteristic in embodiment 3;

FIG. 16 A figure showing a reference table based on a control-cooling characteristic;

DETAILED DESCRIPTION OF THE INVENTION

Embodiments of the present invention will be described with reference to the attached drawings. The invention is applied to a refrigerator-freezer for commercial use.

Embodiment 1

Embodiment 1 will be described with reference to FIGS. 1 to 10.

Figure 1:
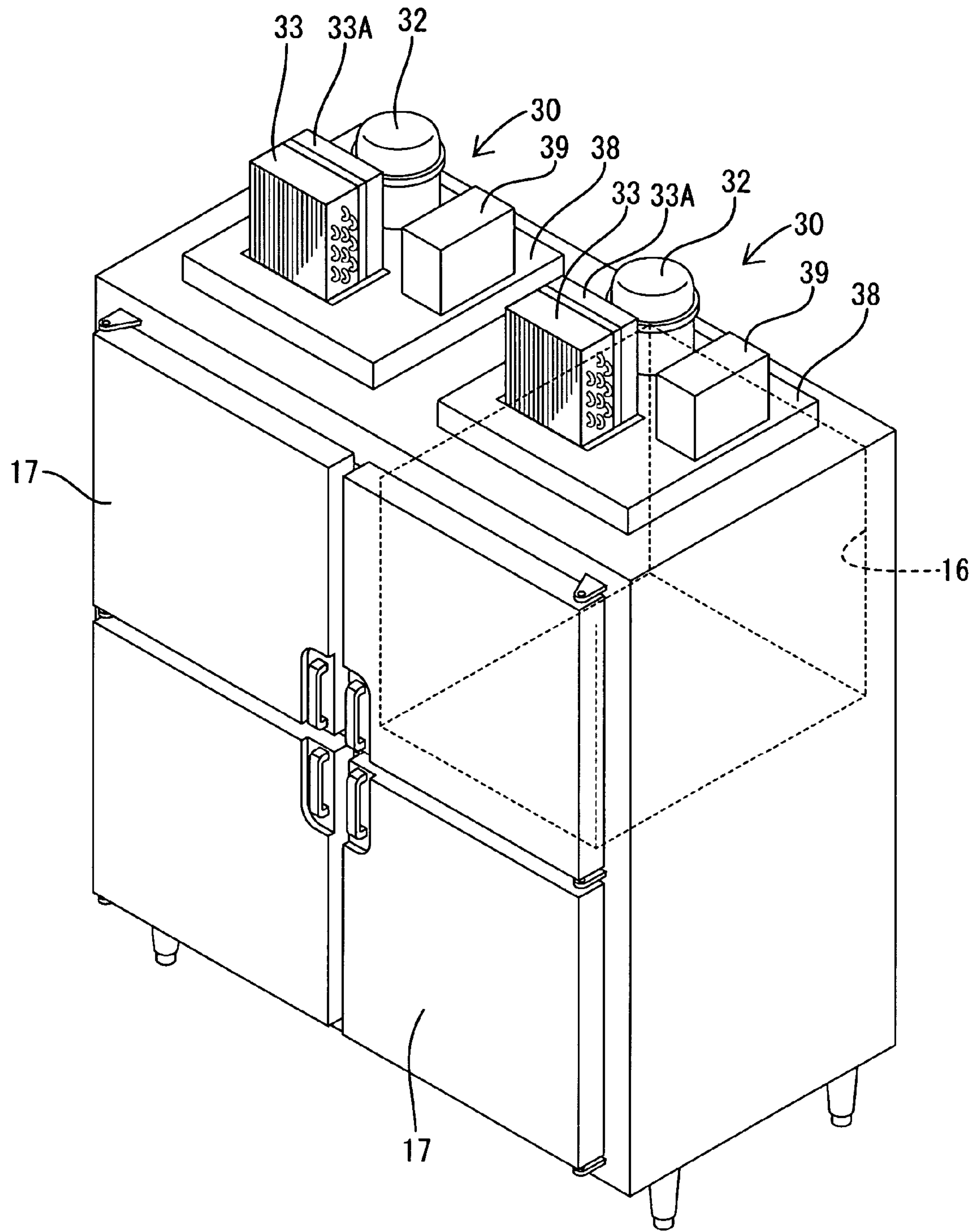
FIG. 1 A perspective view of the refrigerator-freezer in accordance with embodiment 1 of the present invention.
Figure 2:
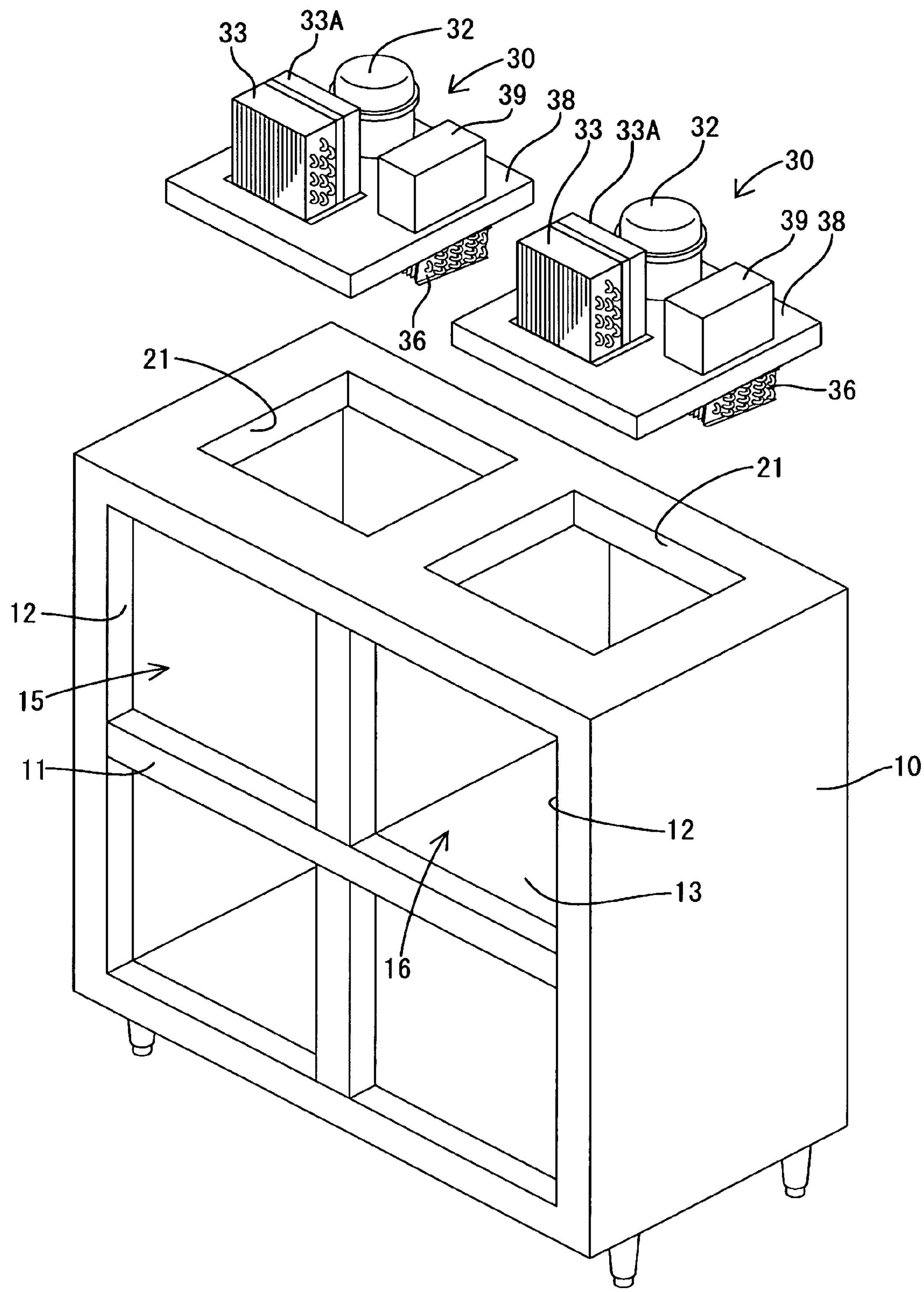
FIG. 2 An exploded perspective view thereof.

The refrigerator-freezer is a four-door type and is provided with a body 10 comprising a heat insulating housing having an open front, as shown in FIGS. 1 and 2. A cruciform partition frame 11 partitions the open front into four access openings 12. Heat insulating walls 13 partition substantially a quarter of the inner space, corresponding to an upper right access opening 12 as viewed from the front, thereby forming a freezing compartment 16. The remaining three quarters of the inner space serve as a refrigerating compartment 15. Heat insulating doors 17 are pivotally mounted so as to respectively close and open the access openings 12.

An equipment compartment is defined on the top of the body 10 by a panel 19 (see FIG. 4) erected around the top of the body. Square openings 21, which have the same size, are formed in the top of the body 10, which serves as a bottom of the equipment compartment 20, so as to respectively correspond to the ceilings of the refrigerating and freezing compartments 15 and 16. Refrigeration units 30 are respectively adapted to be individually mounted in the openings 21.

Figure 3:
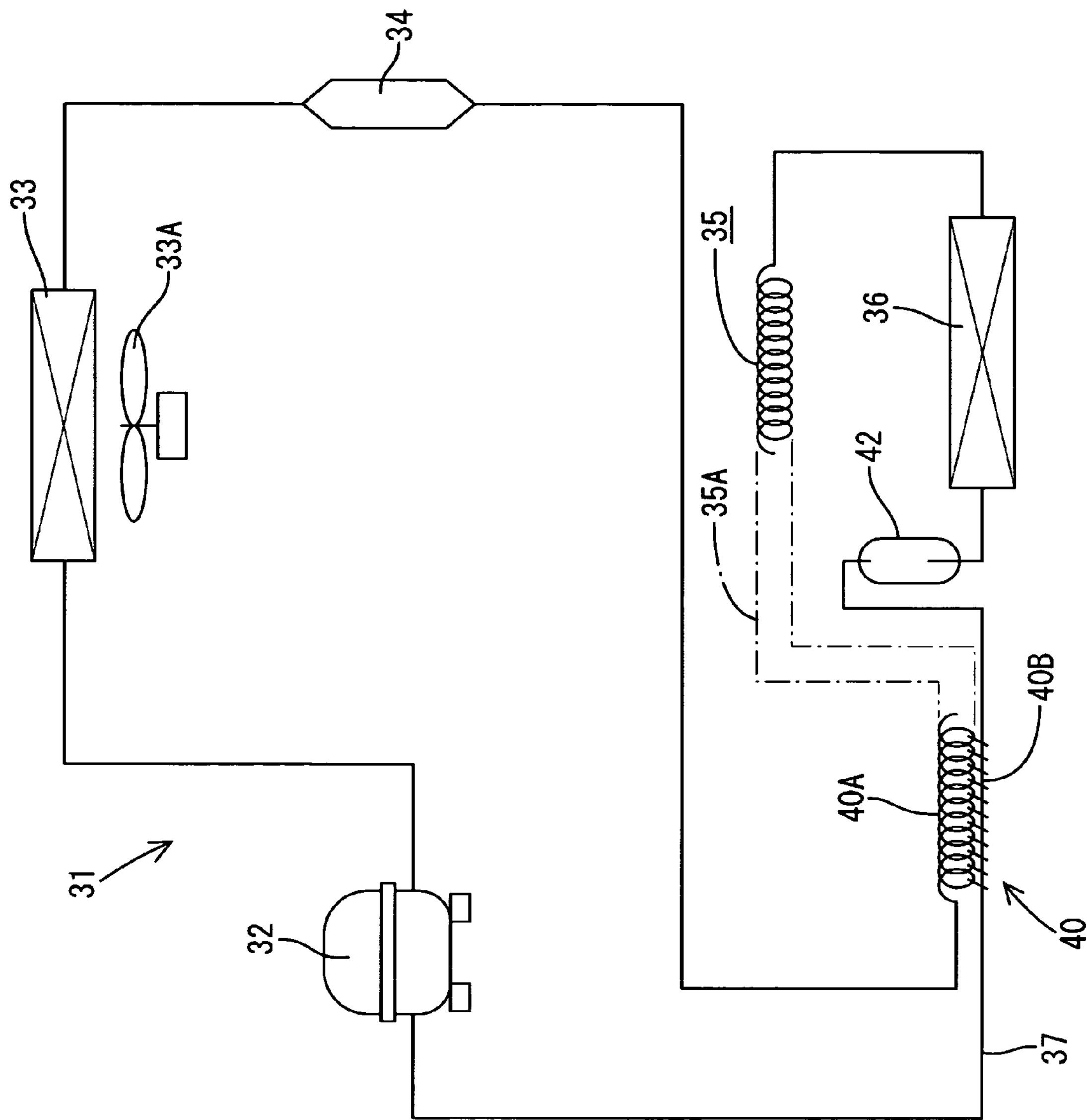
FIG. 3 A diagram of freezing circuit.

Referring to FIG. 3, each refrigeration unit 30 includes a freezing circuit 31, formed by connecting a compressor 32, a condenser 33 with a condenser fan 33A, a drier 34, a capillary tube 35, and an evaporator 36, to one another in a closed loop using refrigerant piping 37, as will be described in detail later. Furthermore, a heat insulating unit mount 38 (see FIG. 4) is mounted to close each opening 21. The evaporator 36, as a part of the refrigeration unit 30, is mounted on the lower side of the unit mount 38. The other components of the refrigeration unit 30 are mounted on the upper side of the unit mount 38.

Figure 4:
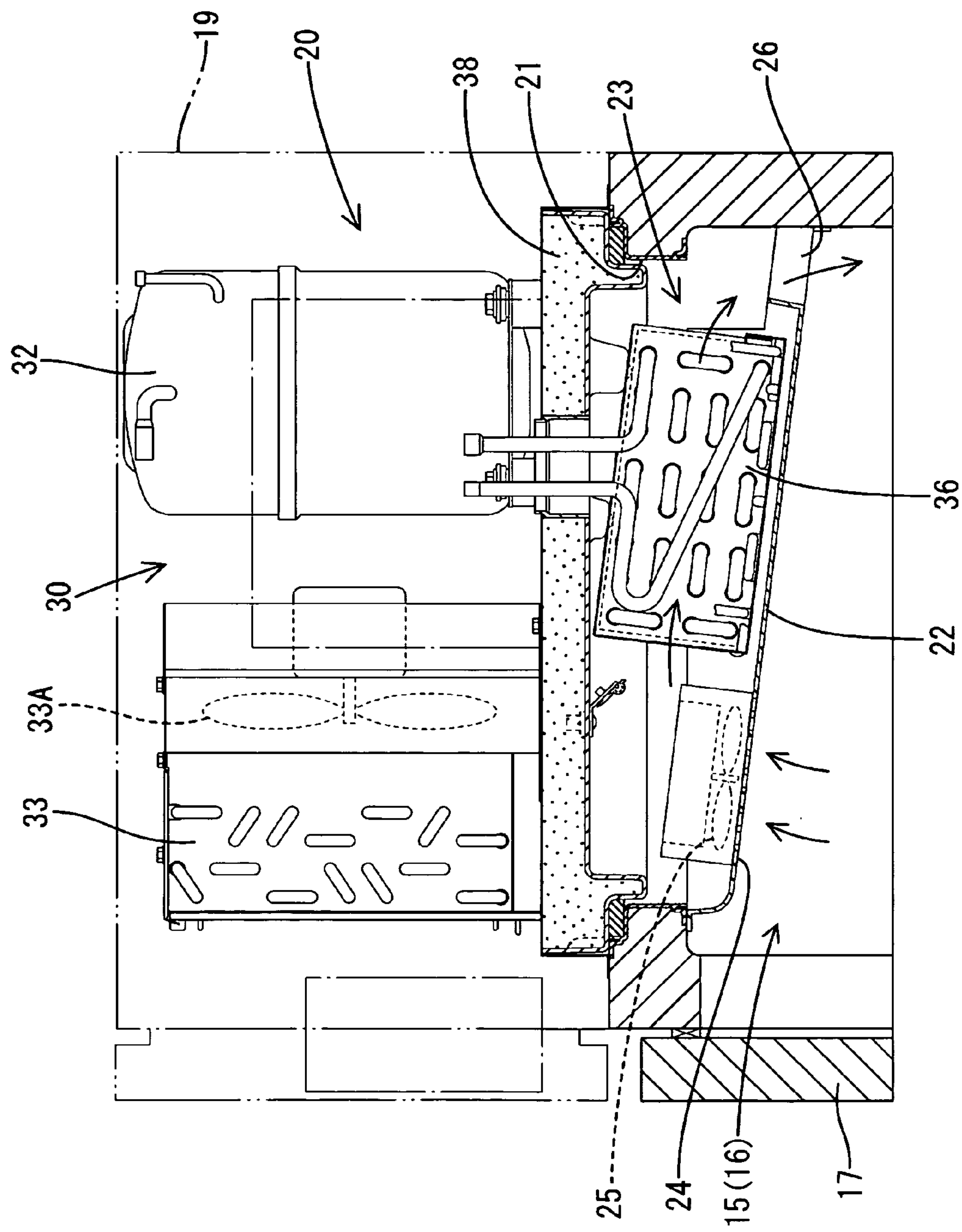
FIG. 4 A partial sectional view of a refrigeration unit.

On the other hand, a drain pan 22, which also serves as a refrigerating duct, is placed near the ceilings of the refrigerating and freezing compartments 15 and 16 and inwardly inclined downward. An evaporator compartment 23 is defined between the unit mount 38 and the drain pan 22, as shown in FIG. 4. The drain pan 22 has an inlet port 24 formed in the upper side thereof. The refrigerating fan 25 is mounted on the upper side of the drain pan 22. The drain pan 22 further has an outlet port 26 formed in the lower side thereof.

Upon the powering of the refrigeration unit 30 and the refrigerating fan 25, essentially, air in the refrigerating compartment 15 (the freezing compartment 16) is absorbed through the inlet port 24 and into the evaporator compartment 23, as shown by the arrows in the FIG. 4. While passing through the evaporator 36, the air is transformed into chilled air through heat exchange. The chilled air is discharged through the outlet port 26 into the refrigerating compartment 15 (the freezing compartment 16), whereby the chilled air is circulated so that the atmosphere is refrigerated in the refrigerating compartment 15 (the freezing compartment 16).

The intent for the refrigeration units 30, provided for the refrigerating and freezing compartments 15 and 16, is to standardize them in this embodiment. The following measures are taken for this purpose.

Firstly, the refrigerating performance of the refrigeration unit 30 depends upon the capacity of the compressor. For example, when identical compressors are used, the volume refrigerated on the freezing side, where the evaporating temperature is lower, is smaller than on the refrigerating side. Furthermore, a larger refrigerating performance is required for either refrigerating or freezing compartments having a larger volume.

More specifically, the required refrigerating performance differs depending upon the conditions of distinction between refrigeration and freezing, or the volumes of the compartments. Accordingly, an inverter compressor 32 is used that has the required maximum capacity and a controllable rotational speed.

Secondly, a common capillary tube 35 is used. The capillary tube 35 corresponds to a part from an exit of the drier 34 to the inlet port of the evaporator 36, in FIG. 3. The capillary tube 35 includes a central helical part 35A, which is provided for increasing the length. The total length of the capillary tube 35 is set at 2000 mm to 2500 mm in this embodiment. The refrigerant piping 37 extends from the exit of the evaporator 36 to an inlet of the inverter compressor 32 and has a length of about 700 mm. Conventionally, a capillary tube for refrigeration has high flow characteristics and a capillary tube for freezing has low flow characteristics. In this embodiment, however, the capillary tube 35 has intermediate flow characteristics, between the refrigeration and the freezing characteristics.

A capillary tube suitable for refrigeration has flow characteristics such that an internal equilibrium temperature, at which the freezing performance of the refrigeration unit balances the thermal load of the heat insulating housing, ranges from about 0° C. to about −10° C. when the refrigeration unit, assembled with the heat insulating housing, is driven at room temperature. Furthermore, a capillary tube suitable for freezing has flow characteristics such that an internal equilibrium temperature ranges from about −15° C. to about −25° C. Accordingly, a capillary tube with intermediate flow characteristics between refrigeration and freezing has flow characteristics such that the internal equilibrium temperature ranges from about −10° C. to about −20° C. when the refrigeration unit is driven under the same conditions as described above.

When the capillary tube 35 has intermediate flow characteristics as described above, there is a concern that the flow rate of liquid refrigerant would be inadequate for the refrigeration region. The following measures are taken in order to resolve that concern.

In this type of freezing circuit, the refrigerant piping 37 at the exit side of the evaporator 36 and the capillary tube 35 are soldered together, thereby forming a heat exchanger so that the general evaporating performance is improved. For example, mist-like liquid refrigerant, which cannot be evaporated by the evaporator 36, is vaporized. In this embodiment, when the heat exchanger 40 is formed between the capillary tube 35 and the refrigerant piping 37, a heat exchanging portion 40A on the capillary 35 side is set at a predetermined area on an upstream side end of the helical portion 35A. The heat exchanging portion 40A is located at a position nearer to the entrance side of the capillary tube 35.

Figure 5A:
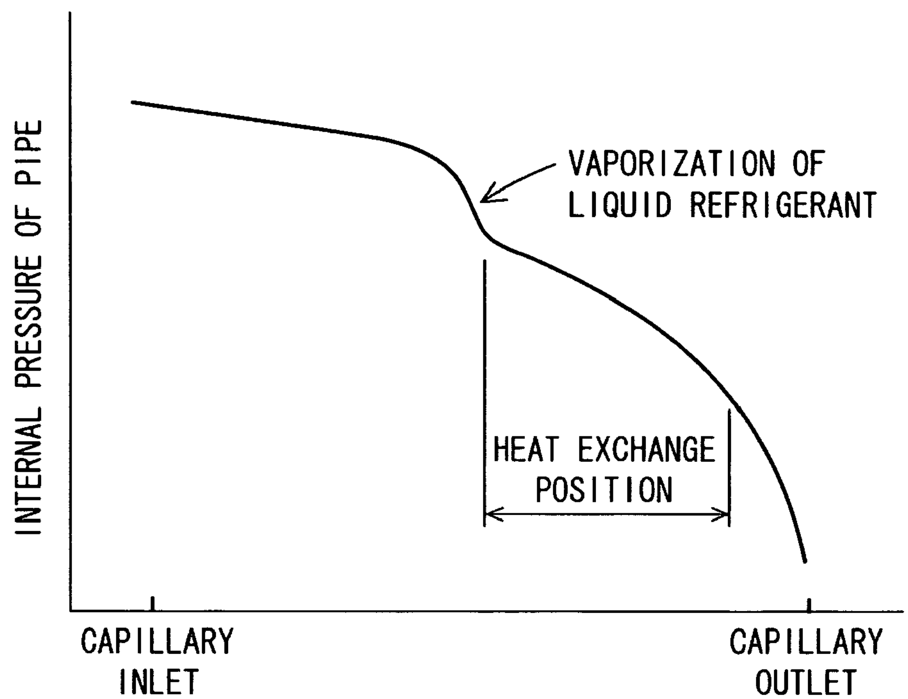
FIGS. 5A and 5B Graphs showing the changes in pressure in a capillary tube.

The capillary tube 35 has a large pressure difference between the inlet and the outlet thereof. As shown in FIG. 5A, the flow resistance is adapted such that it is suddenly increased at a part of the capillary tube 35 where the liquid refrigerant starts to vaporize in the piping (approximately at a central part). In addition, the pressure largely drops from this part to the downstream side (outlet side). The heat exchanging section of the capillary tube 35 is conventionally set at a position nearer to the second half of the whole length of the capillary tube, and rather nearer to the outlet of the capillary tube. As a result, heat exchange is performed even after evaporation (vaporization) starts in the piping. The reason for this is that since the capillary tube 35 is cooled at the side downstream from the heat exchange position, and accordingly causes dew condensation and rust, the heat exchange position is located as near as possible to the outlet side, so that the length of exposed portion in the refrigerated state is limited.

Figure 5B:
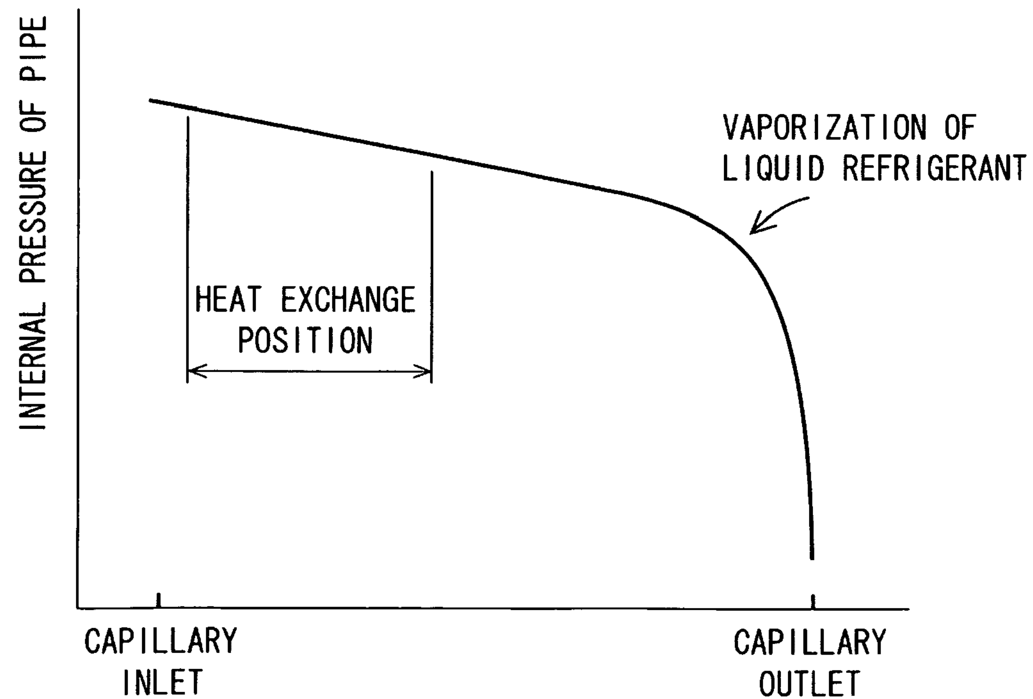

In this embodiment, however, the position of the heat exchanging portion 40A of the capillary tube 35 is set near to the inlet. Specifically, the heat exchanging portion 40A is located before the position where the liquid refrigerant starts to vaporize. As a result, excessive cooling is increased such that the boiling start point in the piping can be shifted to the downstream side of the capillary tube 35, as shown in FIG. 5B. This results in a reduction in the total resistance of the capillary tube 35, whereupon the flow rate of the liquid refrigerant is increased substantially. Consequently, the problem of an insufficient flow rate of the liquid refrigerant can be overcome when a capillary tube 35, having intermediate flow rate characteristics, is used for the refrigerating region.

The heat exchanging portion 40A of the capillary tube 35 is located before the position where the liquid refrigerant starts to vaporize, and at least in the first half region of the whole length of the capillary tube 35, in order that the above-mentioned boiling start point in the piping may be shifted to the downstream side of the capillary tube 35. Alternatively and more preferably, the heat exchanging portion 40A is located within a one third region at the inlet side (the region where there is a large amount of refrigerant in a liquid state).

Furthermore, when the heat exchanging portion 40A of the capillary tube 35 is provided at a position near the inlet, the subsequent longer portion is exposed in a cooling state. Accordingly, this portion is desired to be spaced as far away as possible from the refrigerant piping 37 and to be covered with a heat insulating tube (not shown). As a result, dew condensation and rust can be prevented.

On the other hand, an accumulator 42 (a liquid separator) is provided close to the rear of the evaporator 36 in regard to the insufficiency in throttling in the freezing region when the capillary tube 35 has intermediate flow characteristics. The accumulator 42 provides an adjustment capacity for storing liquid refrigerant in the refrigerating circuit 31.

The refrigerant pressure in the evaporator 36 is lower in the freezing range (the evaporating temperature of the refrigerant is low) and the density of refrigerant gas is low as compared with the pull down cooling range (a range of quick refrigeration) or the refrigeration range. Accordingly, since the amount of refrigerant circulated by the compressor 32 is small, there is an excess of liquid refrigerant in the freezing circuit 31. However, since the excess liquid refrigerant is stored in the accumulator 42, the excess liquid refrigerant can be prevented from flowing into the capillary tube 35 or the like. Consequently, the capillary tube 35 has a substantial effect of throttling the flow rate. Thus, insufficiency in throttling can be overcome when the capillary tube 35 has intermediate flow characteristics.

Regarding the standardization of the capillary tube 35, the capillary tube 35 is adapted for the freezing range with a low flow rate when the capillary tube 35 has intermediate flow rate characteristics and an accumulator 42 is provided directly behind the outlet of the evaporator 36 in order to achieve a throttling effect for a reduction in the flow rate of the liquid refrigerant. In addition, the heat exchanging portion 40A of the capillary tube 35 is located at the side nearer to the inlet so that the total resistance in the piping is reduced, whereby the flow rate of the liquid refrigerant is increased. More specifically, the capillary tube 35 is adapted to the pull down cooling range with a high flow rate and the refrigeration range.

When the accumulator 42 is provided at the downstream side of the heat exchanging portion 40A of the refrigerant piping 37, there is a possibility that the refrigerant may flow into the heat exchanging portion 40A in a mixed gas-liquid state. In this case, the liquid refrigerant evaporates. In other words, the heat exchanging portion 40A performs the evaporation of the liquid refrigerant as excessive work otherwise conducted by the evaporator 36. This leads to a reduction in the refrigerating performance in the freezing circuit 1.

In this embodiment, however, the accumulator 42 is provided directly behind the outlet of the evaporator 36, specifically, at the upstream side of the heat exchanging portion 40B of the refrigerant piping 37. Accordingly, since only refrigerant gas flows into the heat exchanging portion 40B so that excessive evaporation is not performed, the intrinsic refrigerating performance of the freezing circuit 31 can be ensured.

Furthermore, the heat exchanging portion 40A is set at the side nearer to the inlet of the capillary tube 35. As a result, there is a concern that the flow rate of liquid refrigerant may also be increased on the freezing side. However, the concern can be overcome as follows.

In the refrigerating circuit 31 with the capillary tube 35, the high-pressure side and the low-pressure side basically share the refrigerant. Conceptually, in the refrigeration range the refrigerant is in the condenser 33 and the evaporator 36 (including the pull down cooling range), whereas a large amount of refrigerant is in the evaporator 36 and accumulator 42 and a small amount of refrigerant is in the condenser 33 in the freezing range. Accordingly, the refrigerant flows into the capillary tube 35 as a completely liquid flow in the refrigerating range. However, since the refrigerant flows in the mixed gas-liquid state in the freezing range, the flow rate of the refrigerant is reduced. Accordingly, even when heat exchange is carried out at a position nearer to the inlet of the capillary tube 35 such that excessive cooling occurs, the flow rate of the refrigerant is not greatly increased.

On the contrary, as a result of the provision of the accumulator 42, there is a possibility that the flow rate may be reduced in the refrigeration range (including the pull down cooling range). However, for a reason opposite to the reason previously provided, the compressor 32 circulates a large amount of refrigerant in the refrigeration range (including the pull down cooling range). Accordingly, the amount of excess liquid refrigerant in the freezing circuit 31 is small. Because of this, only a little liquid refrigerant is stored in the accumulator 42. Therefore, it is considered that there is almost no possibility of a reduction in the flow rate in the refrigeration range.

As described above, the refrigeration units 30 employ a common structure for refrigeration and freezing. On the other hand, the refrigeration units 30 are individually controlled in operation.

This is based on the perception that a temperature characteristic in pull down cooling changes to a large extent depending upon conditions such as the division between refrigeration and freezing or the internal capacity. In the refrigerators-freezers for commercial use, doors are frequently opened and closed so that food materials are placed into and taken out of compartments, and the ambient temperature is relatively higher. In view of this, it should be taken into sufficient consideration that the internal temperature may easily rise. Accordingly, temperature drop characteristics should be considered as a returning force in the internal temperature rise, specifically, pull down cooling temperature characteristics. Consequently, a performance test is compulsory for pull down cooling. However, since the refrigeration speed largely depends upon a heat insulating housing as described above, the performance test needs to be conducted with the refrigeration units already assembled with the heat insulating housings. As a result, there is a problem in that the complexity of the performance test cannot be overcome, even when the refrigeration units are standardized.

In this embodiment, means is provided for controlling the internal temperature along a temperature curve in pull down cooling without dependence on the heat insulating housing.

Figure 6:
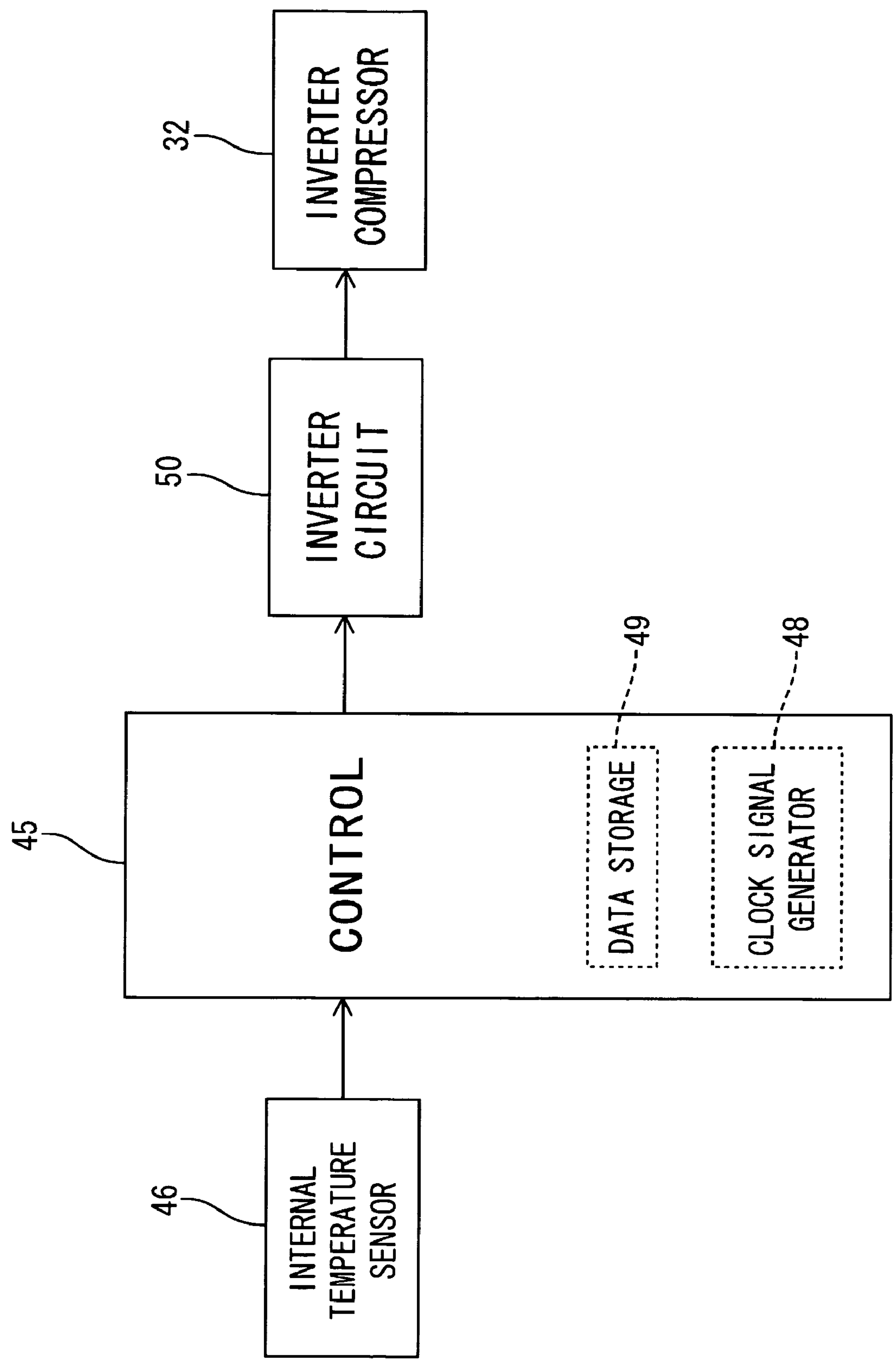
FIG. 6 A block diagram of the control mechanism of an inverter compressor.
Figure 7:
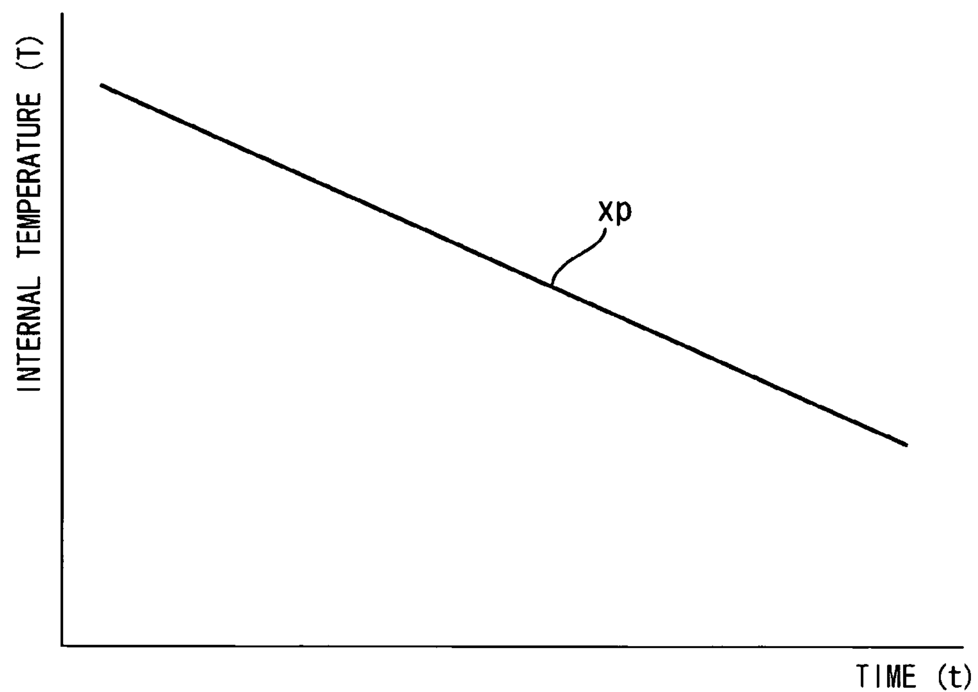
FIG. 7 A graph showing a pull down cooling characteristic.

For this purpose, as shown in FIG. 6, a control 45 is provided that includes a microcomputer and executes a predetermined program. The control 45 is enclosed in an electrical equipment box 39 provided on an upper side of the unit mount 38. An internal temperature sensor 46, detecting an internal temperature, is connected to the input side of the control 45.

Figure 8:
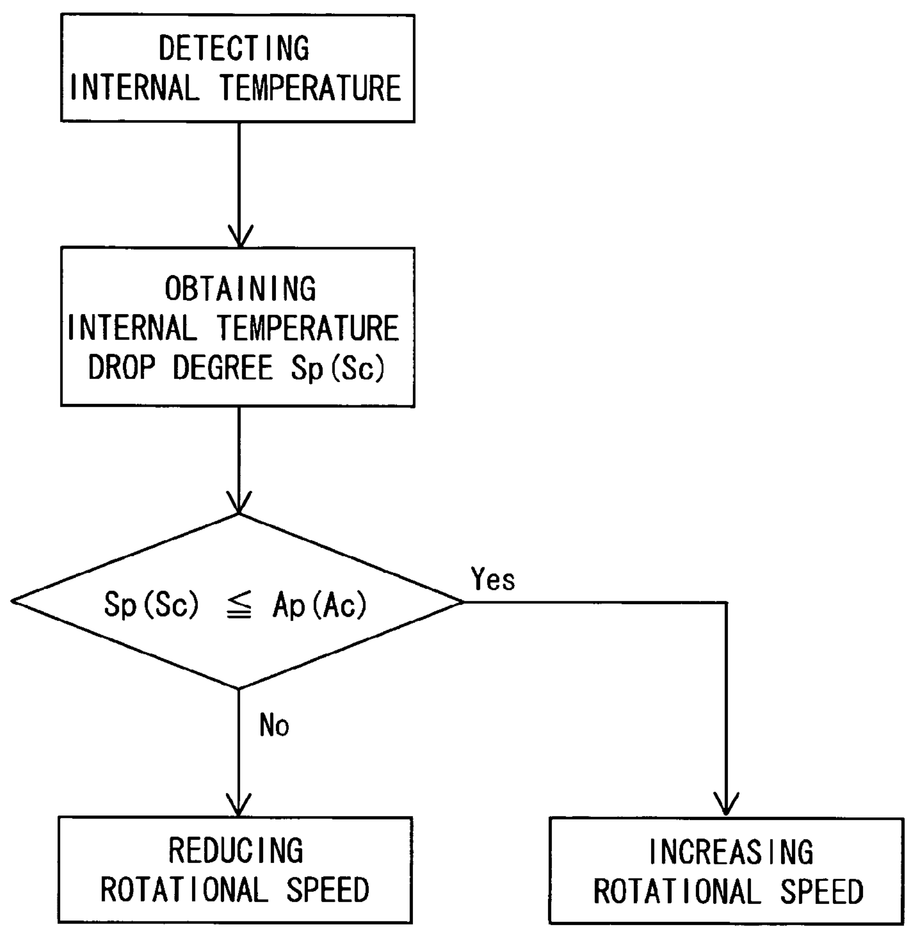
FIG. 8 A flowchart showing a control operation of the inverter compressor.

The control 45 is provided with a clock signal generator 48 and data storage 49, which stores a linear line 'xp' of a linear function; as an ideal temperature curve in pull down cooling, as shown in FIG. 8. When the ideal curve is a linear line 'xp', a target internal temperature drop degree (temperature change per unit of time $\Delta T/\Delta t$) is a predetermined valued 'Ap' irrespective of the internal temperature.

An inverter compressor 32 is connected via an inverter circuit 50 to the input side of the control 45.

Pull down control starts when the internal temperature has risen to or above a set internal temperature by a predetermined value.

As shown in FIG. 8, an actual internal temperature drop degree Sp(Sc) is obtained at every detection cycle. The obtained value Sp(Sc) is compared with a target value Ap(Ac) read from data storage 49. When the obtained value Sp(Sc) is equal to or below the target value Ap(Ac), the rotational speed of the inverter compressor 32 is increased via the inverter circuit 50. On the other hand, when the obtained value Sp(Sc) is larger than the target value Ap(Ac), the rotational speed of the compressor 32 is reduced. This is repeated at predetermined time intervals so that pull down cooling is carried out along an ideal curve (linear line xp).

After the above-described pull down cooling, control refrigeration is preformed for both refrigeration and freezing. As a result, the internal temperature is maintained at a value close to the previously set temperature. The following advantages can be obtained from provision of an inverter compressor 32. In the execution of control refrigeration, when the inverter compressor 32 is controlled so that the rotational speed thereof is reduced stepwise in the vicinity of the set temperature, the temperature drops quite slowly. As a result, a significantly longer continuous ON time is generated for the compressor, or in other words, the number of occurrences of ON-OFF switching is reduced to a large extent. Furthermore, low-speed operation results in high efficiency and energy saving.

In the above-described case, the refrigerating performance in the low-speed operation of the inverter compressor 35 needs to be set to exceed an assumed standard thermal load. When the refrigerating performance cannot exceed the assumed thermal load, the internal temperature is not lowered to the set temperature but instead is thermally balanced, remaining at a value above the set temperature. When a common refrigeration unit 30, including the inverter compressor 32, is used as in this embodiment, the heat insulating housing having the highest heat invasion amount characteristics needs to be regarded as the thermal load.

Special attention is paid to refrigerators (freezers) for commercial use so that the variations in internal temperature distribution are minimized, in order that the food materials may be stored at a predetermined level of quality. For this purpose, the refrigeration fan 23 has the function of circulating a large amount of air. Consequently, a relatively larger amount of heat is generated by the electric motor of the fan. When this condition is accompanied with another or other conditions such as the heat capacity of food materials, ambient temperature, frequency of door operations and the like, sometimes a larger than expected thermal load is generated.

As a result, the internal temperature may remain at a value slightly lower than a set temperature, because the inverter compressor 32 is operating at a low speed, with excessively long On time when the temperature drop results in only a slight change.

It can be considered that there is no problem when the internal temperature remains at a value slightly lower than the set temperature. However, it is not preferable for the continued operation of the refrigerator while the inverter compressor 32 remains in an on state. The reason for this is that frost continuously falls on the evaporator 36 due to outside air entering into the refrigerator with the opening and closing of the doors 17, or due to aqueous vapor emanating from food material. Conversely, the temperature of the evaporator 36 is increased to or above 0° C. when the inverter compressor 32 is suitably turned off. As a result, it is considered preferable to have a suitable OFF time in order to maintain the heat exchanging function of the evaporator 36.

In this embodiment, energy savings are achieved by taking advantage of the use of the inverter compressor 32 in control refrigeration. With this, control means is provided to reliably afford an OFF time.

Figure 9:
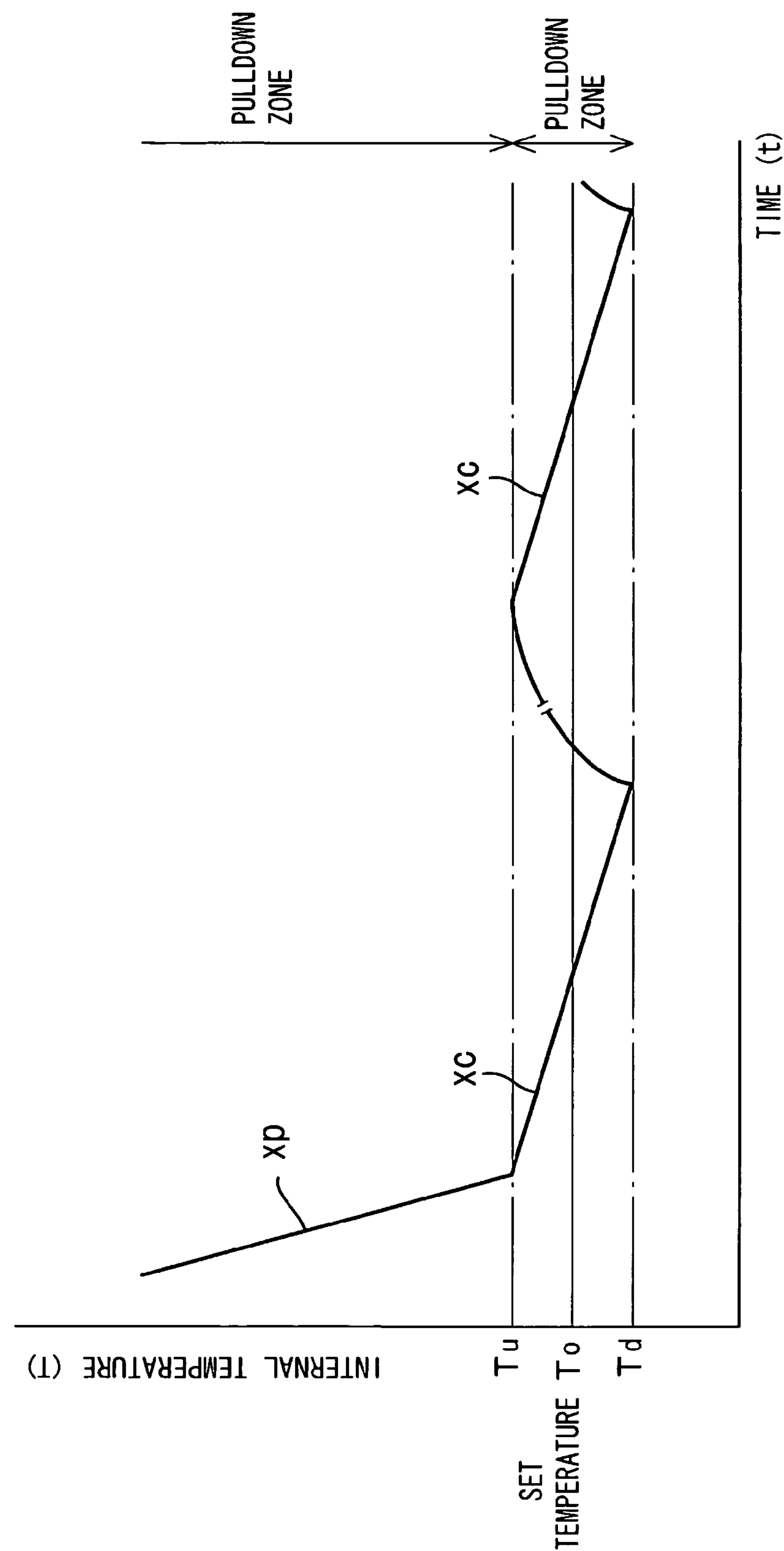
FIG. 9 A graph showing changes in the temperature in the control-cooling zone.

In short, the inverter compressor 32 is controlled in the control refrigeration range so that the internal temperature is in alignment with an ideal temperature curve, in the same manner as the in the foregoing pull down cooling range. This temperature curve is set as linear line xc, which has a gentler gradient than the ideal curve (linear line xp) in pull down cooling, as shown in FIG. 9. In the case of the ideal curve xc, too, the internal temperature drop degree is constant but smaller than the ideal curve xp.

The ideal curve xc is stored in data storage 49 and used in the execution of a control refrigeration program that is also stored in the control 45.

Control refrigeration basically has the same operating characteristics as in pull down cooling. Control refrigeration starts when the internal temperature has dropped to an upper limit temperature Tu, which is higher than a set temperature To by a predetermined value. In control refrigeration, the internal temperature is detected at intervals of predetermined periods. An actual internal temperature drop degree Sc is obtained in synchronization with the detection of the internal temperature and thereby compared with a target value of the internal temperature drop degree Sc. The obtained drop rate Sc is compared with a target value Ac (constant) of the internal temperature drop degree under the ideal temperature curve xc. When the obtained value Sc is less than the target value Ac, the rotational speed of the inverter compressor 32 is increased. On the contrary, when the obtained value Sc is larger than the target value Ac, the rotational speed of the inverter compressor 32 is reduced. This is repeated at intervals of predetermined periods so that the internal temperature slowly drops along the ideal curve (linear line xc).

The inverter compressor 32 is turned off when the internal temperature is reduced to a lower limit temperature Td, which is lower than the set temperature To by a predetermined value, whereupon the internal temperature slowly rises. When the internal temperature returns to the upper limit temperature Tu, temperature control along the temperature curve xc is again performed. Thus, the procedure is repeated so that the interior is maintained about the set temperature To.

According to the control in control refrigeration, refrigeration can be performed via the use of the inverter compressor 32 together with energy savings, and an OFF time for the inverter compressor 32 can be reliably ensured. As a result, a large amount of frost can be prevented because the evaporator 36 performs a defrosting function.

Figure 10:
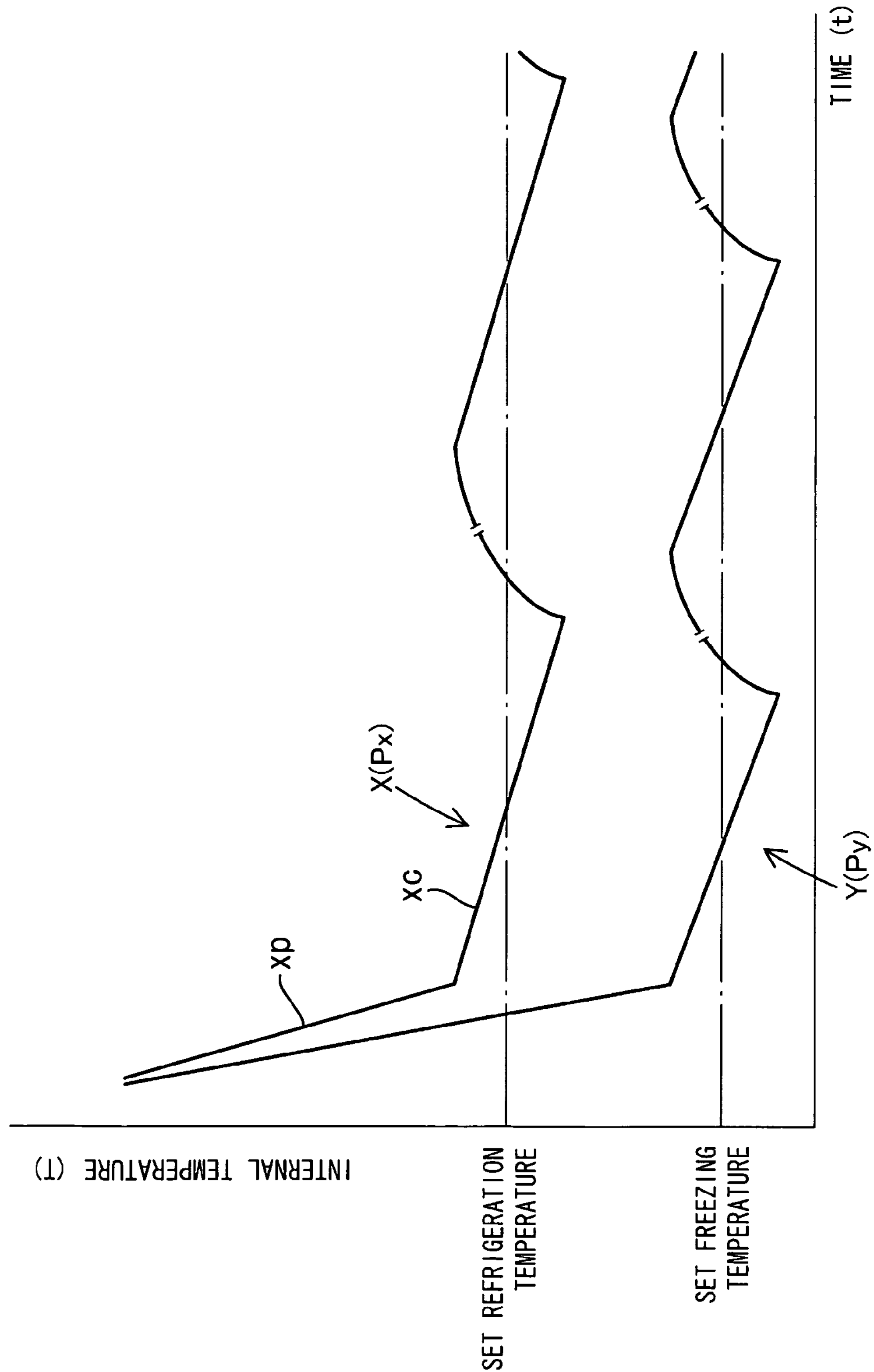
FIG. 10 A graph showing internal temperature characteristics for comparison of the refrigeration and freezing sides.

Thus, for example, an operation program Px (refrigeration program Px) is provided that controls the inverter compressor 32 so that the internal temperature is in alignment with a temperature characteristic X (see FIG. 10). This includes the ideal curves xp and xc, from pull down cooling to control refrigeration on the refrigeration side, for example.

On the other hand, at the freezing side, the set internal temperature differs from the set internal temperature at the refrigeration side, although the basic control operation at the freezing side is the same as at the refrigeration side. Furthermore, the operating time of the inverter compressor 32 is made shorter at the freezing side than at the refrigeration side in order for the prevention of frost formation during the control refrigeration, whereupon an ideal curve at the freezing side differs from the ideal curve at the refrigeration side. Accordingly, an operation program Py (freezing program Py) is required that controls the inverter compressor 32 so that the internal temperature is in alignment with a temperature characteristic Y in the aforesaid figure at the freezing side, for example.

Each refrigeration unit 30 is provided with an equipment box 39 in which the control 45 is enclosed. Both of the above-mentioned programs Px and Py are stored in the control 45 together with data of ideal curves.

The embodiment has a structure as described above. The body 10, comprising the heat insulating housing, and two standardized refrigeration units 30, separate from the body, are carried to an installation site. The refrigeration units 30 are respectively mounted in the openings 21 of the ceilings of the refrigerating and freezing compartments 15 and 16. Thereafter, set internal temperatures are respectively supplied to the refrigerating compartments 15 and 16. Furthermore, the refrigerating program Px is selected at the control section 45 provided in the refrigeration unit 30, attached to the refrigerating compartment 15 side, by switches (not shown) or the like provided in the equipment box 39. On the other hand, the freezing program Py is selected at the control section 45 provided in the refrigeration unit 30 attached to the freezing compartment 16 side.

As obvious from the foregoing, the refrigerating and freezing compartments 15 and 16 are respectively controlled and cooled on the basis of the individual operation programs Px and Py.

Regarding pull down cooling, for example, the refrigerating compartment 15 will be described again. When the internal temperature rises above the set temperature by a predetermined value or above, with the opening and closing of the doors or the like, pull down control starts and the internal temperature is detected at each sampling time. As shown in FIG. 8, the degree of actual internal temperature drop Sp is computed on the basis of the internal temperature detected at every sampling time and compared with a target value Ap. When the computed value Sp is less than the target value Ap, the rotational speed of the inverter compressor 32 is increased. For the contrary case, the rotational speed of the inverter compressor 32 is decreased. Speed increases and decreases are repeated, whereby pull down cooling is performed so as to follow an ideal curve (linear line xp). Subsequently, the control operation is executed.

The operation is also performed on the freezing compartment 16 side in the same manner as described above.

Control-cooling will be described again with respect to the refrigerating compartment 15. Control-cooling starts when the internal temperature drops to the upper limit temperature Tu via pull down cooling. The internal temperature is detected at every sampling time. As shown in FIG. 8, the degree of actual internal temperature drop Sc is computed on the basis of the internal temperature detected at every sampling time and compared with a target value Ac. When the computed value Sc is less than the target value Ac, the rotational speed of the inverter compressor 32 is increased. For the contrary case, the rotational speed of the inverter compressor 32 is decreased. Speed increases and decreases are repeated, whereby the internal temperature gradually drops along an ideal curve (linear line xc). When the internal temperature drops to the lower limit temperature Td, the inverter compressor 32 is turned off so that the internal temperature may gradually rise. The temperature control is performed again along the temperature curve xc when the internal temperature returns to the upper limit temperature Tu. The above temperature control is repeated so that the inner atmosphere is substantially maintained about the set temperature To.

Control-cooling is also executed on the freezing compartment 16 side in the same manner as described above.

The following effects are achieved from this embodiment.

Pull down cooling can be performed at both refrigeration and freezing sides according to the predetermined pull down cooling characteristics, irrespective of conditions such as the capacity of the heat insulating housing to which the refrigeration units 30 are attached. Accordingly, the performance test in pull down cooling has no relation with the heat insulating housing actually used to which the refrigeration unit is attached. For example, a test heat insulating housing can be used for the performance test. Consequently, the degrees of freedom in the place and the time of a performance test can be greatly increased.

Furthermore, excessive pull down cooling can be prevented from being executed for a small heat insulating housing. Therefore, the above-described arrangement can contribute to energy savings. Particularly in this embodiment, the linear line xc of the linear function is selected as an ideal temperature curve in pull down cooling. As a result, calculation is not required since the target physical amount reduction degree is constant, irrespective of the lapse of time. Accordingly, the control system can be simplified.

Furthermore, since the internal temperature is gradually decreased at a gentle gradient or along an ideal curve (linear line xc) in control-cooling, the continuous ON time of the inverter compressor 32 is made longer. In other words, the number of ON-OFF switching cycles of the inverter compressor 32 is greatly reduced. In addition, since the inverter compressor is operated at low speeds, high efficiency and energy savings can be achieved. On the other hand, since the lower end of the ideal curve (linear line xc) reaches the lower limit temperature Td, the inverter compressor 32 can be reliably stopped for suitable intervals of time. During the stopping of the inverter compressor 32, the evaporator 36 can perform a defrosting function so that a large amount of frost formation can be prevented.

Particularly in this embodiment, the linear line xc of a linear function is selected as the ideal temperature curve in control-cooling. As a result, calculation is not required since the target physical amount reduction degree is constant, irrespective of the lapse of time. Accordingly, the control system can be simplified.

In the practical use of the refrigerating storage cabinet, there are situations in which the formation of frost greatly differs, depending upon conditions such as the installation location, the frequency at which the door is opened and closed, or the types of food to be stored. Accordingly, a plurality of programs is available, differing from each other in the operating time of the inverter compressor 32. When each program is selectively performed according to the conditions of use, an optimum control-cooling can be performed according to those conditions.

Embodiment 2

Embodiment 2 of the present invention will be described with reference to FIGS. 11 to 13.

Figure 11:
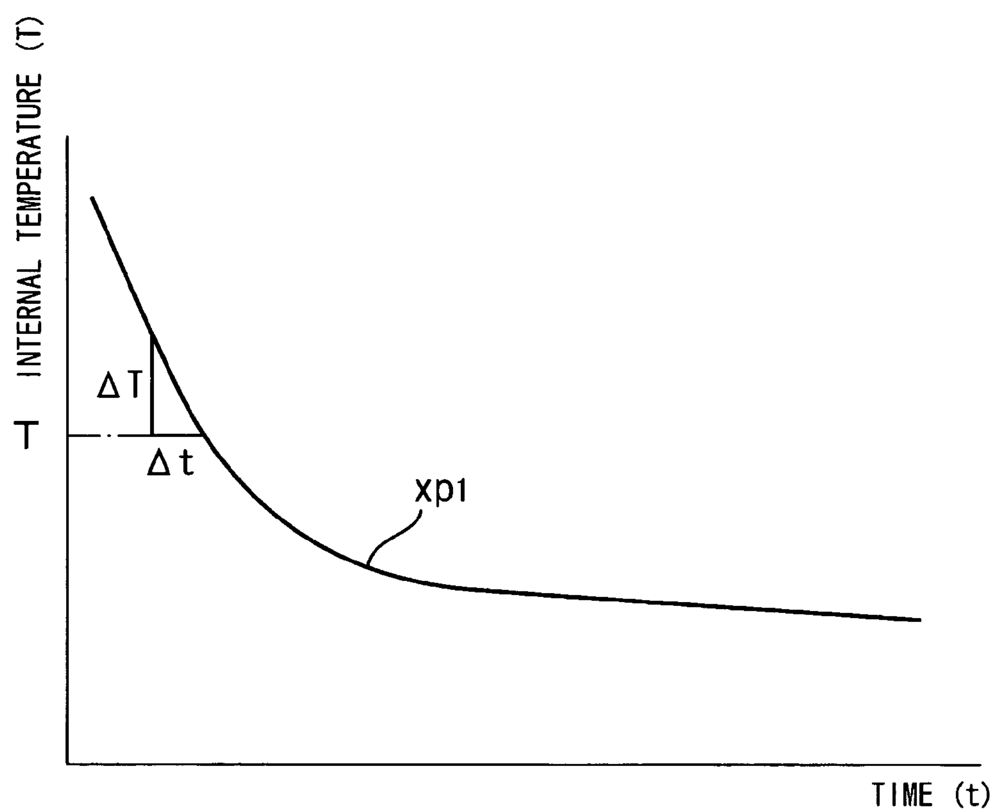
FIG. 11 A graph showing a pull down cooling characteristic in embodiment 2.
Figure 12:
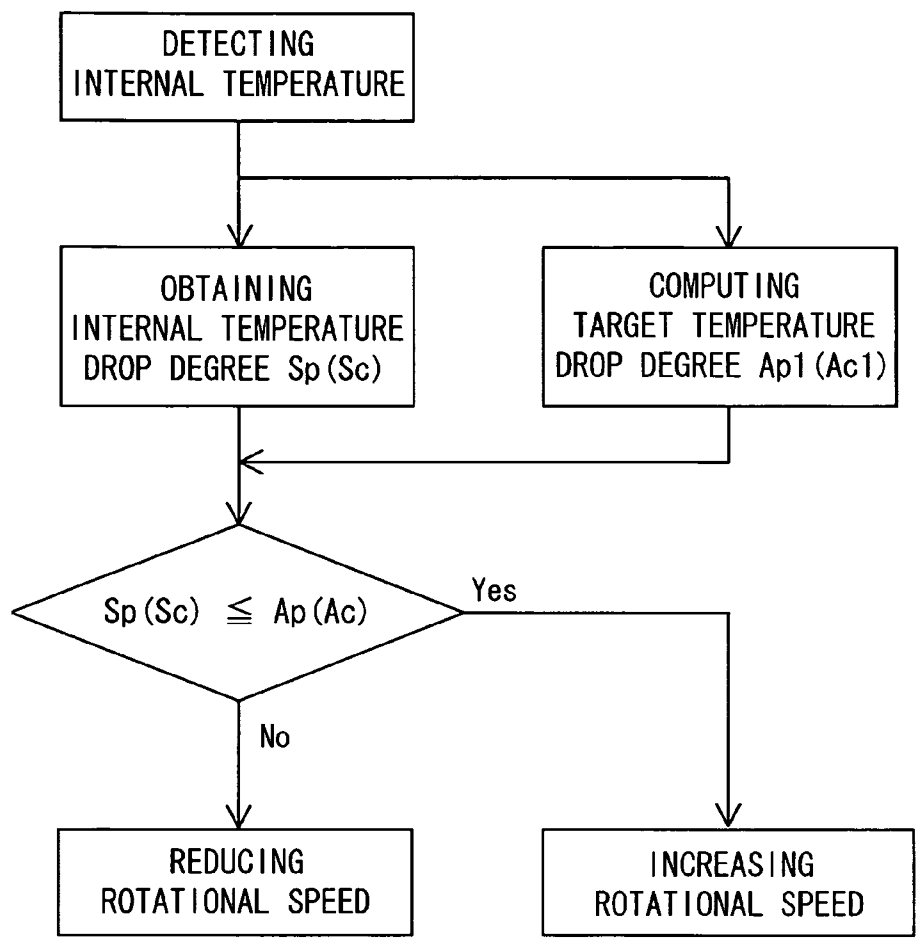
FIG. 12 A flowchart showing a control operation for the inverter compressor.

In embodiment 2, an ideal temperature curve in pull down cooling is formed by the curve xp1 of a quadratic function involving a physical amount and time, as shown in FIG. 11. When a constant speed compressor is used, the temperature drop characteristic in pull down cooling is generally represented as a quadratic function curve. On the other hand, this temperature drop characteristic has had real accomplishments in the market and has earned a fine reputation from its users. This characteristic is used as an ideal curve $xp_1$.

In the case of the quadratic function curve $xp_1$, the degree of target temperature drop is not constant, but differs depending upon the internal temperature. Accordingly, a computing section is provided for computing the target temperature drop degree. More specifically, in the computing section a target temperature drop degree $Ap_1$ is computed from the above quadratic function curve $xp_1$ as a temperature drop amount ($\Delta T/\Delta t$) per unit of time in the internal temperature, thereby being provided. The temperature drop degree $Ap_1$ may be obtained from the differentiation ($dT/dt$) of the quadratic function curve $xp_1$.

The operation is as follows. Pull down control starts when the internal temperature rises so that the internal temperature is detected at every sampling time. The actual internal temperature drop degree Sp is computed on the basis of the internal temperature detected at every sampling time, as shown in FIG. 12. On the other hand, the target temperature drop degree $Ap_1$ at the current internal temperature is computed from the quadratic function curve $xp_1$ in the computing section. The computed target value $Ap_1$ is compared with the actual temperature drop degree Sp. When the actual temperature drop degree Sp is less than the target value $Ap_1$, the rotational speed of the inverter compressor 32 is increased.

For the contrary case, the rotational speed of the inverter compressor 32 is decreased. The speed increases and decreases are repeated so that pull down cooling is performed along the ideal curve (quadratic function curve $xp_1$). Subsequently, control-cooling is executed. The same operations can also be performed on the freezing compartment 16 side.

Accordingly, pull down cooling can be performed on the basis of a temperature drop characteristic that has had real accomplishments in the market and has earned a fine reputation from its users.

Additionally, instead of comparing the target value $Ap_1$ with the actual temperature drop degree Sp obtained at each sampling time, an average value of the target values $Ap_1$ may be compared with an average value of the actual temperature drop degree Sp obtained every time, after the passage of several sampling cycles. For example, a more accurate control can be achieved that is not so easily influenced by a temporary change in the internal temperature.

The ideal curve xp1 of quadratic function curve in the embodiment 2 has a target temperature drop degree changing from moment to moment. For example, a temperature curve of pull down cooling in a no-load condition can be applied in an actual refrigerator (no articles to be refrigerated in the refrigerator-freezer).

The target temperature drop degree is required in order that a time-temperature characteristic on the ideal curve may be directly reproduced. This involves the following intention: for example, in a case where pull down cooling is performed as a trial operation on a customer site after installation, a refrigerator with a constant speed compressor, without an inverter, is quite typical when the refrigerator operates in the same manner as a model refrigerator (temperature changing manner).

Furthermore, as described above, an ideal curve of a model refrigerator in a no-load condition is applied to the ideal curve for control. Accordingly, for example, when food material is placed into the refrigerator, the degree of temperature drop slows down and becomes smaller than the target temperature drop degree. Since the inverter compressor is controlled so that the rotational speed thereof is increased in order to compensate for the slowdown, the cooling performance is increased. In short, the rotational speed of the inverter compressor 32 tends to be increased as a larger amount of food material is placed in the refrigerator. This demonstrates the high performance of the refrigerator. Since the refrigerator behaves as if the entry of food material were detected, the above control manner is called a "sensorless control."

Furthermore, when the ideal curve of pull down cooling is a quadratic function curve, a steep gradient occurs in the start-up. As a result, articles can be quickly refrigerated. In addition, the gradient becomes gentler when the internal temperature approaches near to the set temperature. As a result, overshooting or excessive cooling can be prevented.

Figure 13:
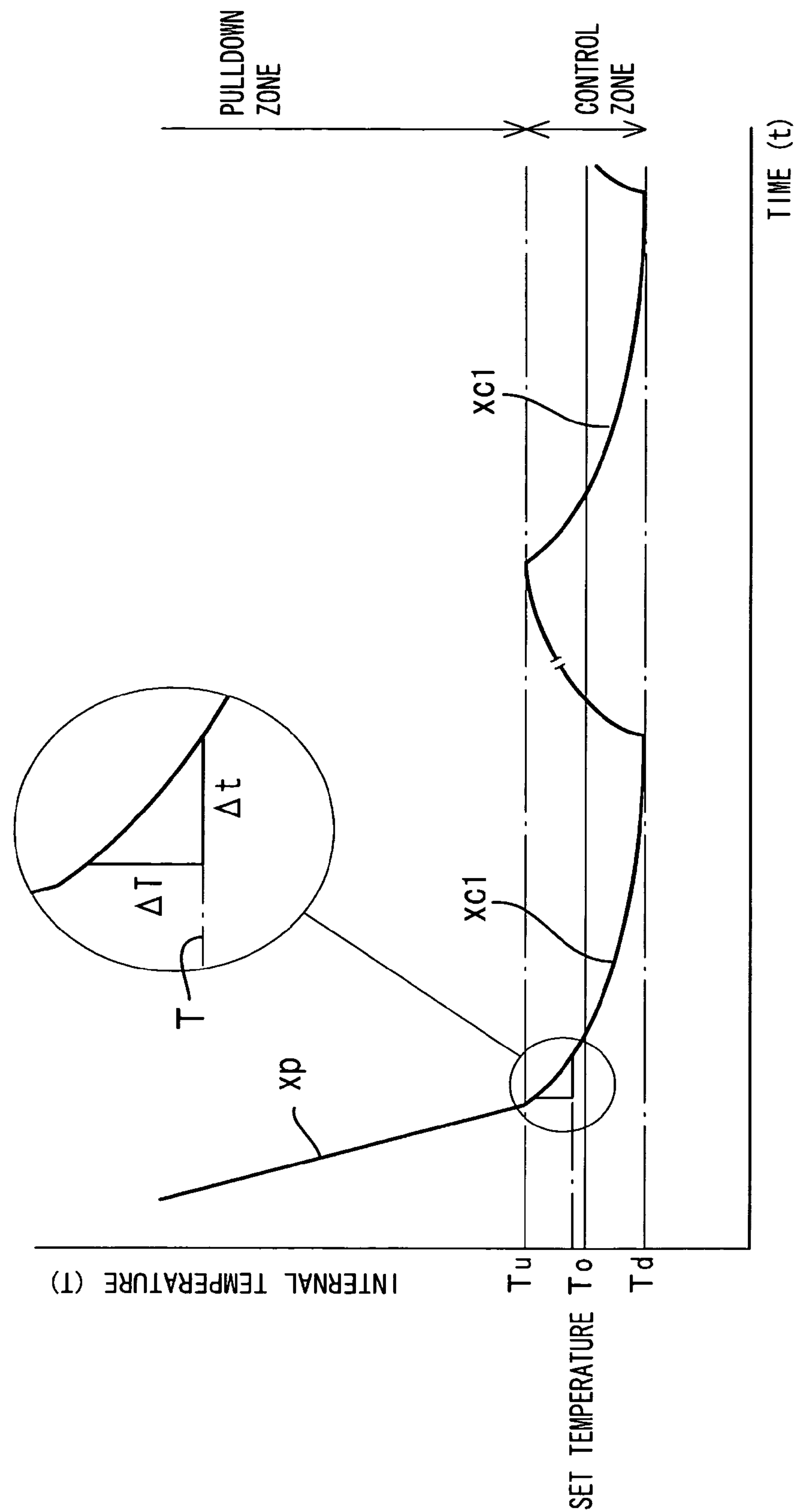
FIG. 13 A graph showing a control-cooling characteristic.

Additionally, an ideal temperature curve in control-cooling may also be formed by the temperature-time curve $xc_1$ of a quadratic function (T=f(t)), as shown in FIG. 13. On the average, as with the linear line xc in embodiment 1, the curve $xc_1$ represents a gradual temperature reduction.

In the case of the quadratic function curve $xc_1$, however, a target temperature drop degree is not constant, but instead differs depending upon the internal temperature. Accordingly, a computing section is provided for computing the target temperature drop degree. More specifically, in the computing section a target temperature drop degree $Ac_1$ is computed as a temperature drop amount ($\Delta T/\Delta t$) per unit of time in the internal temperature from the above quadratic function curve $xc_1$, thereby being produced. The temperature drop degree $Ac_1$ may be obtained as the differentiation (dT/dt) of the quadratic function curve $xc_1$.

In operation, the refrigerator proceeds to control-cooling when the internal temperature drops to the upper limit temperature Tu. The internal temperature is detected at every predetermined sampling cycle. An actual internal temperature drop degree Sc is computed on the basis of the detected internal temperature at every sampling time, as shown in FIG. 12. On the other hand, the target temperature drop degree $Ac_1$ at the current internal temperature is computed in the computing section using the quadratic function curve $xc_1$. The computed target value $Ac_1$ is compared with the actual temperature drop degree Sc. When the actual temperature drop degree Sc is less than the target value $Ac_1$, the rotational speed of the inverter compressor 32 is increased. For the contrary case, the rotational speed of the inverter compressor 32 is decreased. The speed increases and decreases are repeated so that pull down cooling is performed along an ideal curve (quadratic function curve $xc_1$). Subsequently, control-cooling is executed. The same operations can also be carried out at the freezing compartment 16 side.

As in embodiment 1, control-cooling can be performed with energy savings. In addition, an operation stop time of the inverter compressor 32 can be reliably provided at suitable intervals.

Furthermore, an ideal curve of pull down cooling may be the quadratic function curve $xp_1$, and an ideal curve of control-cooling, continuing from pull down cooling, may be the linear line xc of a linear function, as shown in embodiment 1 above.

Embodiment 3

Figure 15:
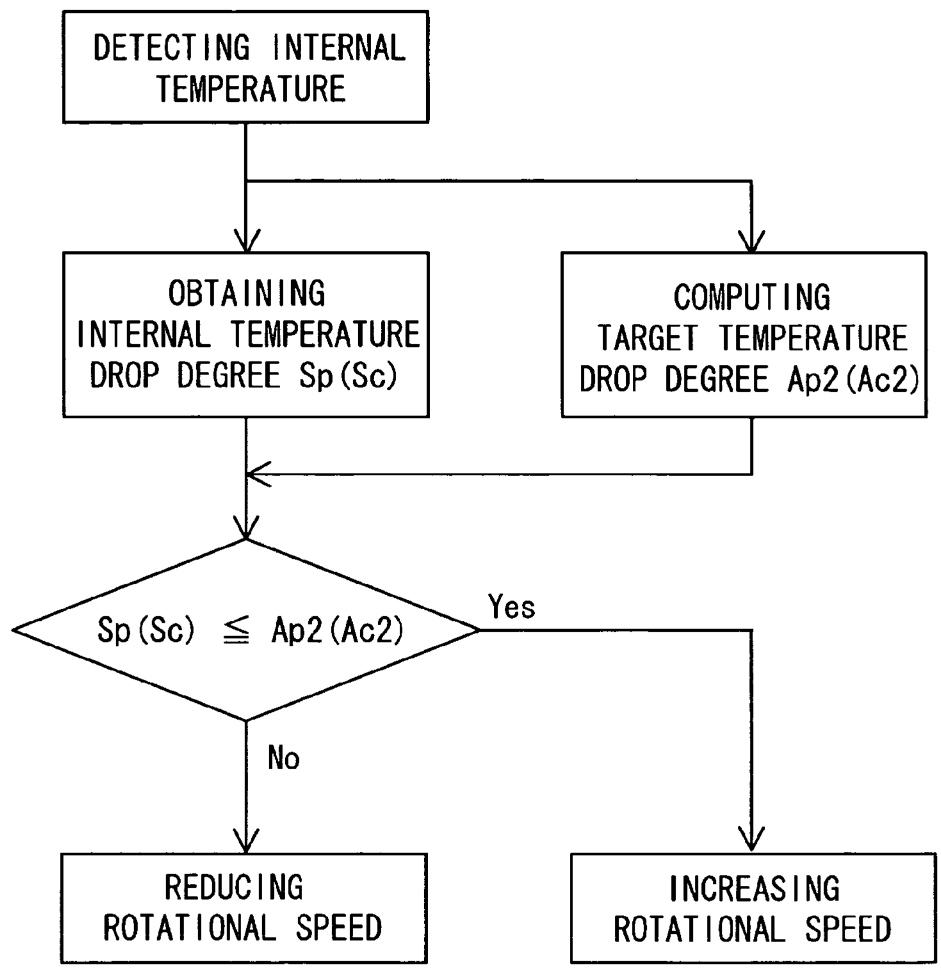
FIG. 15 A flowchart showing a control operation for the inverter compressor.

FIGS. 14 to 16 illustrate embodiment 3 of the invention. In embodiment 3, the target temperature drop degree $Ap_2$, corresponding to an internal temperature, is previously obtained on the basis of an ideal pull down cooling characteristic. A reference table relating the internal temperature with the target temperature drop degree $Ap_2$ is generated beforehand and stored in a data storing section 49, as shown in FIG. 14.

The operation of embodiment 3 is as follows. Upon the start of pull down control, the internal temperature is detected at each predetermined sampling time. As shown in FIG. 14, the actual internal temperature drop degree Sp is computed on the basis of the detected internal temperature at every sampling time. A target temperature drop degree $Ap_2$ for the current internal temperature is retrieved from the reference table, thereby to be provided. The delivered target value $Ap_2$ is compared with the actual internal temperature drop degree Sp. When the actual internal temperature drop degree Sp is less than the target value $Ap_2$, the rotational speed of the inverter compressor 32 is increased. For the contrary case, the rotational speed of the inverter compressor 32 is decreased. The speed increases and decreases are repeated so that pull down cooling is performed following along an ideal pull down cooling characteristic. Subsequently, control operation is executed. The operations are executed in the same manner on the freezing compartment 16 side.

In embodiment 3, a temperature drop characteristic that has had real accomplishments in the market and has earned a fine reputation from its users, as exemplified in embodiment 2, can be applied as an ideal pull down cooling characteristic.

In particular, the target temperature drop degree $Ap_2$ is obtained only through the retrieval of the reference table, no computation is required. As a result, the control speed can be increased.

Furthermore, a target temperature drop degree $Ac_2$, corresponding to an internal temperature, is previously obtained on the basis of an ideal control-cooling characteristic. A reference table relating the internal temperature with the target temperature drop degree $Ac_2$ is previously produced and stored in the data storing section 49, as shown in FIG. 16. A temperature that can belong to the control-cooling zone serves as the internal temperature stored in the reference table.

In operation, upon the start of control-cooling, the internal temperature is detected at each sampling time. As shown in FIG. 15, the actual internal temperature drop degree Sc is computed on the basis of the detected internal temperature at every sampling time. A target temperature drop degree $Ac_2$ at the current internal temperature is retrieved from the reference table, thereby to be provided. The provided target value $Ac_2$ is compared with the actual internal temperature drop degree Sc. When the actual internal temperature drop degree Sc is less than the target value $Ac_2$, the rotational speed of the inverter compressor 32 is increased. For the contrary case, the rotational speed of the inverter compressor 32 is decreased. The speed increases and decreases are repeated so that control-cooling is performed to follow along an ideal pull down cooling characteristic (approximate quadratic function, for example). The operations are executed in the same manner on the freezing compartment 16 side.

As in embodiments 1 and 2, control-cooling can be performed with energy savings, and an operation stop time for the inverter compressor 32 can be reliably provided at suitable intervals. In the same way, the reference table is only retrieved in order to obtain the target temperature drop degree $Ac_2$, but no computation is required. As a result, the control speed can be increased.

Embodiment 4

Figure 17:
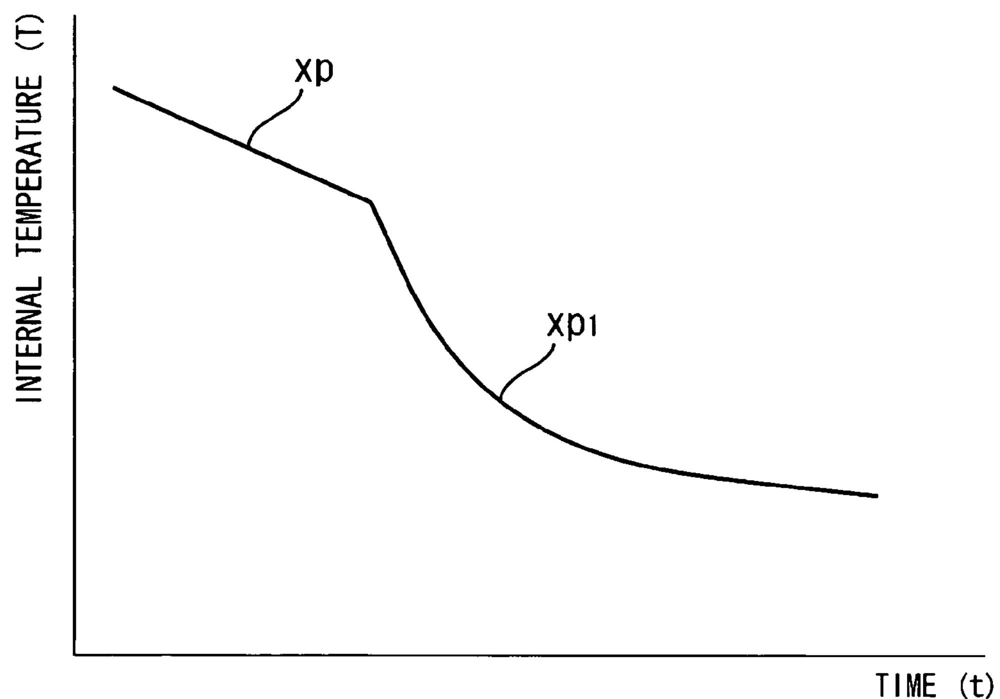
FIG. 17 A graph showing a pull down cooling characteristic in embodiment 4.

FIG. 17 illustrates embodiment 4 of the invention. Embodiment 4 is directed to pull down cooling. For example, in a refrigerator with a set internal temperature of 3° C., it is rare for the internal temperature to rise to 15° C. or 20° C., even though the door may be frequently opened and closed, or a large amount of warm food material is placed within the refrigerator. It is the zone at or lower than 20° C. or 15° C. that requires a returning force. In this zone, rapid refrigeration following a pull down cooling characteristic of a quadratic function is desirable. However, when a quadratic function is applied to the zone at or higher than 20° C. or 15° C. (first half of pull down cooling), a large cooling performance is required. Accordingly, the inverter compressor 32 able to cope with high-speed rotation or an evaporator 33 with a large capacity is required. In other words, in order to cope with the first half of pull down cooling, which has low frequency and is less important, the provision of the above inverter compressor or evaporator is almost excessive.

Accordingly, in embodiment 4, a linear function xp (see embodiment 1) is applied to a pull down cooling characteristic in the first half of pull down cooling. A quadratic (see embodiment 2) or an approximate exponential (reference table type; see embodiment 3) function $xp_1$ is applied to the pull down cooling characteristic in the second half of the pull down cooling.

In the case where the linear function xp is followed, the rotational speed of the inverter compressor is initially low and gradually increased. Accordingly, the inverter compressor 32 able to cope with an unnecessary high-speed rotation or an evaporator 33 with a high heat-radiating performance is not provided. On the other hand, rapid refrigeration can be realized in the second half of pull down cooling requiring an internal temperature returning force.

Embodiment 5

Figure 18:
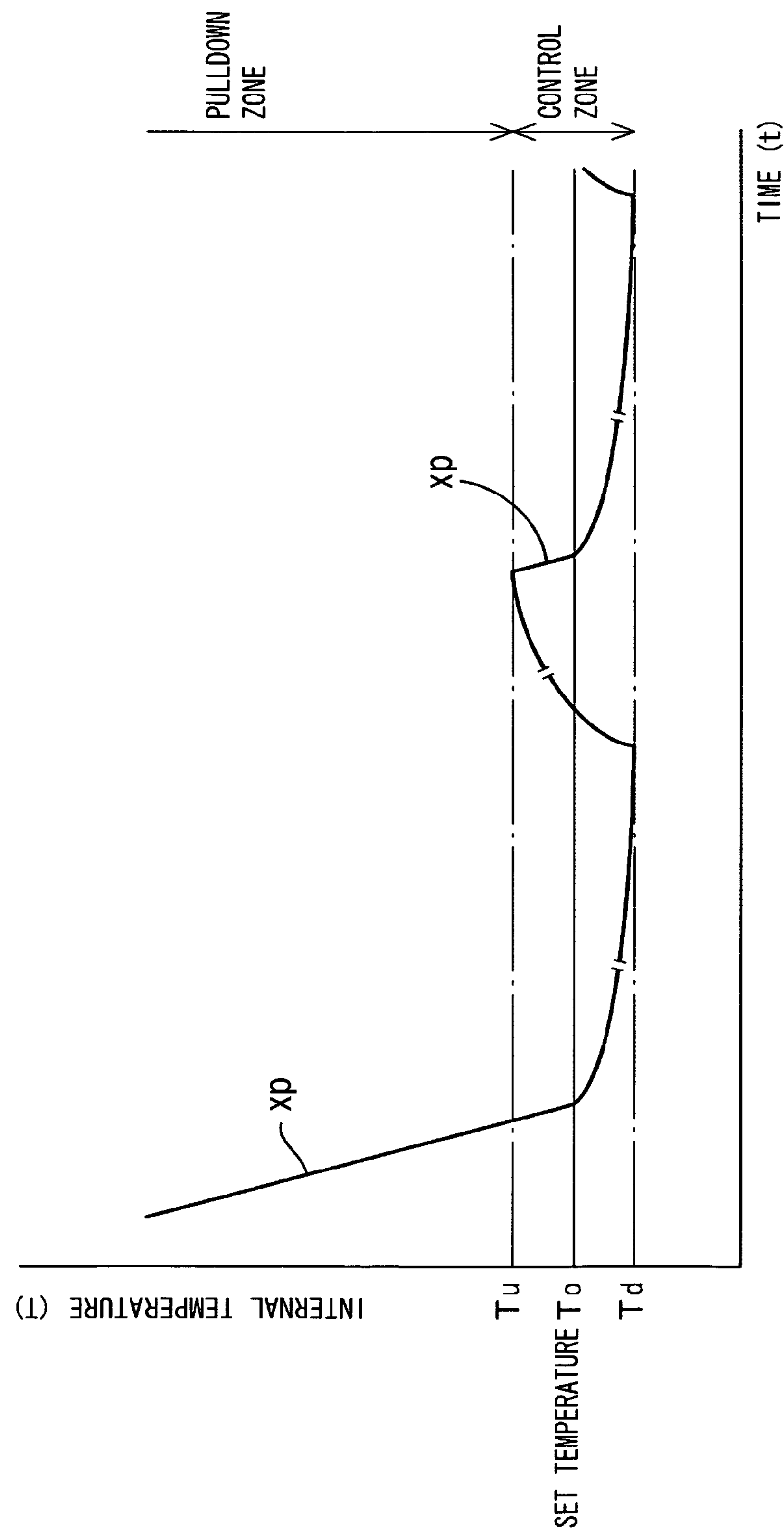
FIG. 18 A graph showing a mode of control-cooling in embodiment 5.

Embodiment 5 of the invention will be described with reference to FIG. 18. As exemplified in embodiment 1, pull down cooling is performed so as to follow an ideal pull down cooling characteristic (linear line xp) in the pull down cooling zone. In embodiment 5, however, even when the internal temperature reaches the upper limit temperature Tu and enters the control-cooling zone, pull down cooling is continued, following the cooling characteristic xp with the inverter compressor 32 under speed control, until the set temperature To is reached.

The control on the basis of the cooling characteristic xp ends when the internal temperature has dropped to the set temperature To. At the same time, the rotational speed of the inverter compressor 32 is reduced. Subsequently, the internal temperature gradually drops. The inverter compressor 32 is turned off when the internal temperature has reached the lower limit temperature Td. When the internal temperature gradually rises, returning to the upper limit temperature Tu, control on the basis of the above cooling characteristic (linear line xp) is performed until the internal temperature reaches the set temperature To and the rotational speed of the inverter compressor 32 is reduced. The above operation is repeated so that the interior is maintained approximately about the set temperature To.

The internal temperature is decreased to the set temperature To for the period following pull down cooling when the internal temperature has entered the control-cooling zone. Accordingly, even when the inverter compressor 32 is operated at low speeds for energy savings, the internal temperature reliably drops to the lower limit temperature Tu. After which, the inverter compressor 32 can be stopped. Similarly, a defrosting operation is performed in the evaporator 36 such that a large amount of frost formation can be prevented. The same control can also be executed on the freezing compartment 36 side.

Embodiment 6

Figure 19:
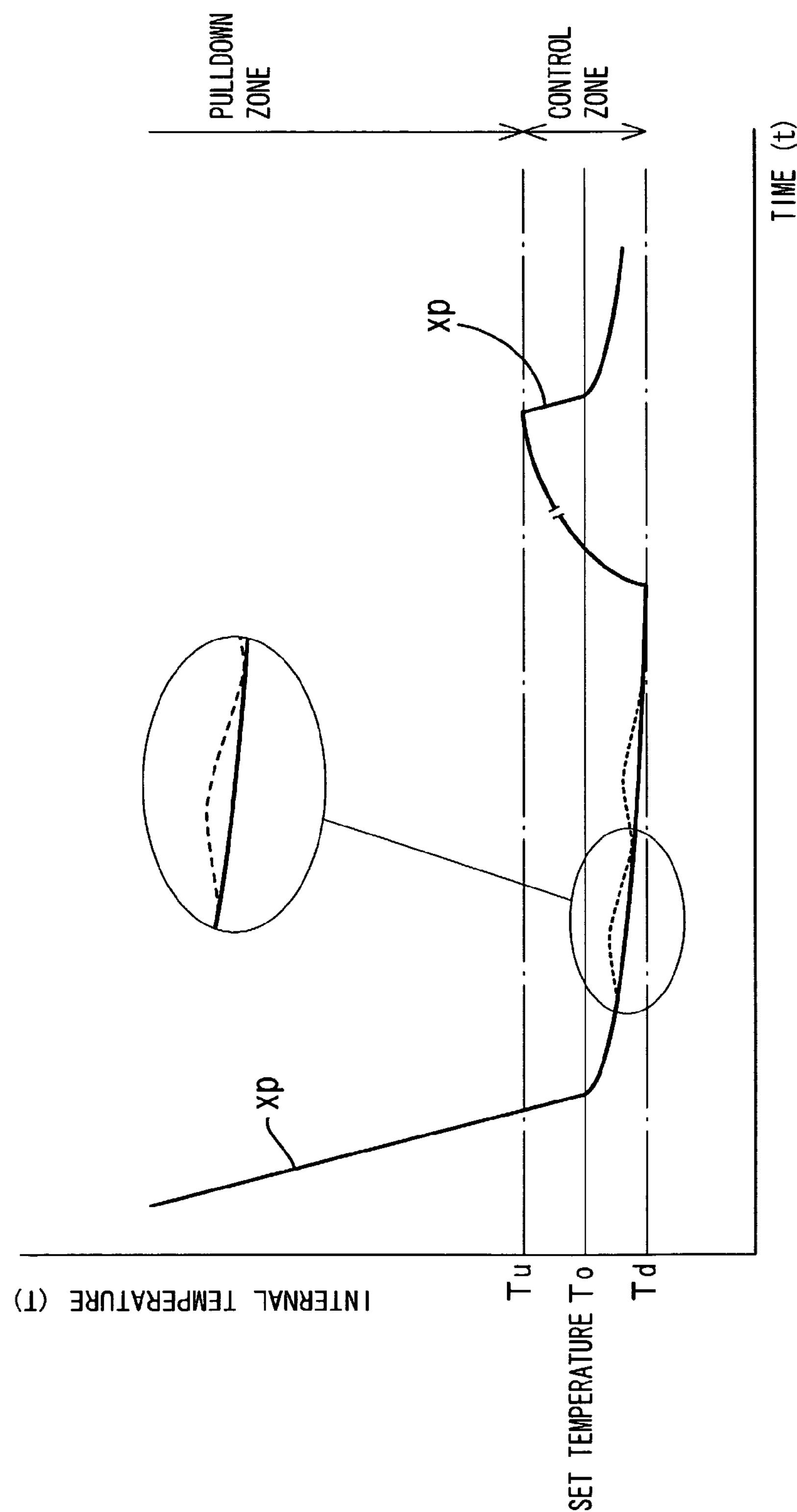
FIG. 19 A graph showing a mode of control-cooling in embodiment 6.
Figure 20:
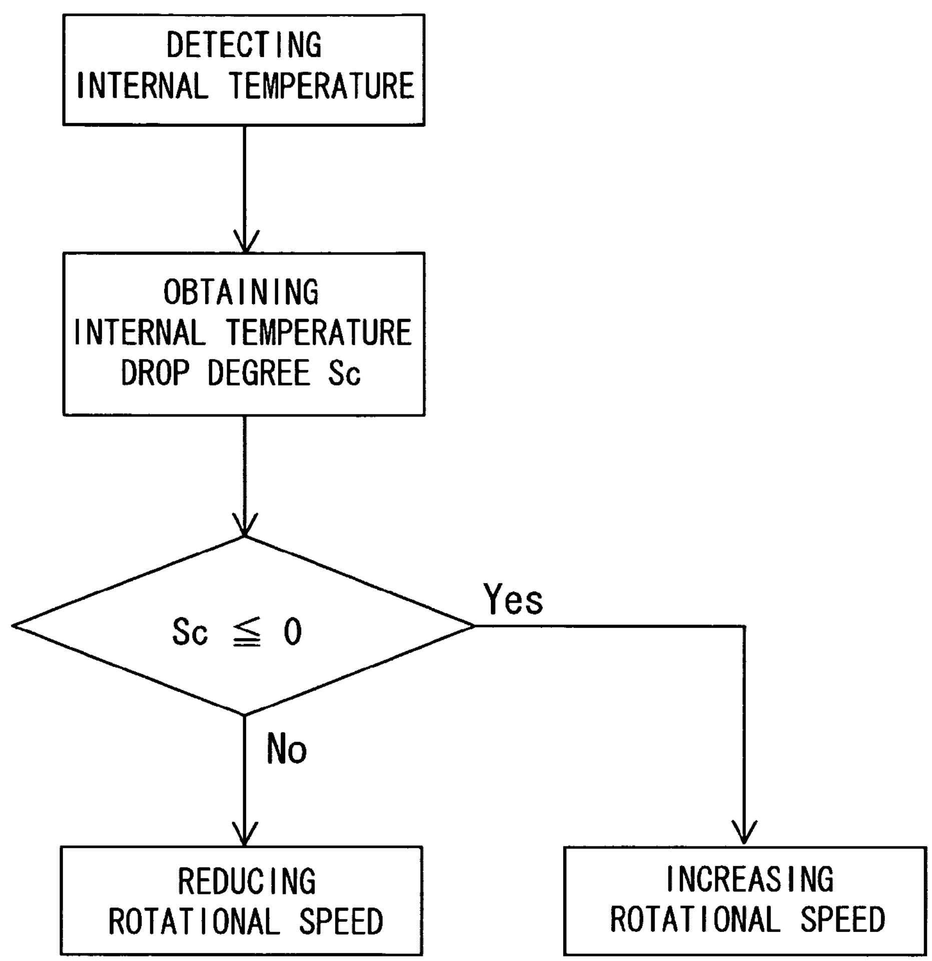
FIG. 20 A flowchart showing a control operation for the inverter compressor.

FIGS. 19 and 20 illustrate embodiment 6. Embodiment 6 provides an improvement of embodiment 5. In the above embodiment 5, the internal temperature is decreased to the set temperature To in a single period. Thereafter, the rotational speed of the inverter compressor 32 is reduced so that the internal temperature gradually drops to the lower limit temperature Tu. When variations in the load or the like cause the internal temperature to rise in the middle of a temperature drop, it takes a great deal of time for the internal temperature to drop to the lower limit temperature Td. Accordingly, there is the creation of concern that the continuous ON time of the inverter compressor 32 will become unduly long.

In view of this problem, embodiment 6 provides a control function for compensation. In describing the operation, as shown in FIG. 19, the rotational speed of the inverter compressor 32 is reduced after the internal temperature has dropped to the set temperature To. When entering a (spontaneous) temperature drop zone, the internal temperature is detected at every sampling time. As shown in FIG. 20, the actual internal temperature drop degree Sc is computed on the basis of the internal temperature detected at every sampling time. The inverter compressor 32 is maintained at the current rotational speed when the computed value Sc is positive or when the internal temperature has dropped.

Conversely, when the actual internal temperature drop degree Sc is negative (including zero), the internal temperature is regarded as having reversed direction, rising in the middle, as shown by the broken lines in FIG. 19. The rotational speed of the inverter compressor 32 is increased. As a result, the internal temperature again drops. The rotational speed of the inverter compressor 32 is repeatedly increased when necessary, whereby the internal temperature is forced to reliably drop to the lower limit temperature Td.

Additionally, when the actual internal temperature drop degree Sc is positive, namely, the internal temperature is regarded as having reversed direction and dropping, the rotational speed of the inverter compressor 32 may be reduced towards a speed at which the compensation control starts.

Embodiment 7

Figure 21A:
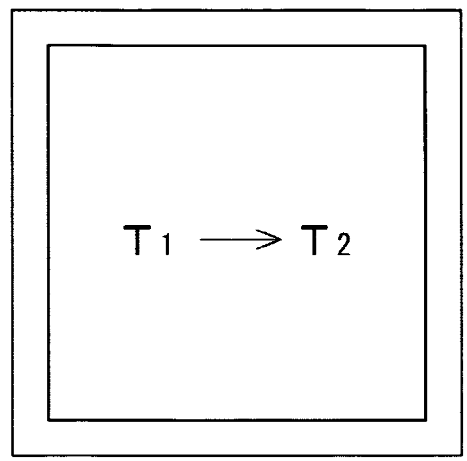
FIGS. 21A and 21B An explanation and a graph of changes in the internal temperature in embodiment 7, respectively.
Figure 21B:
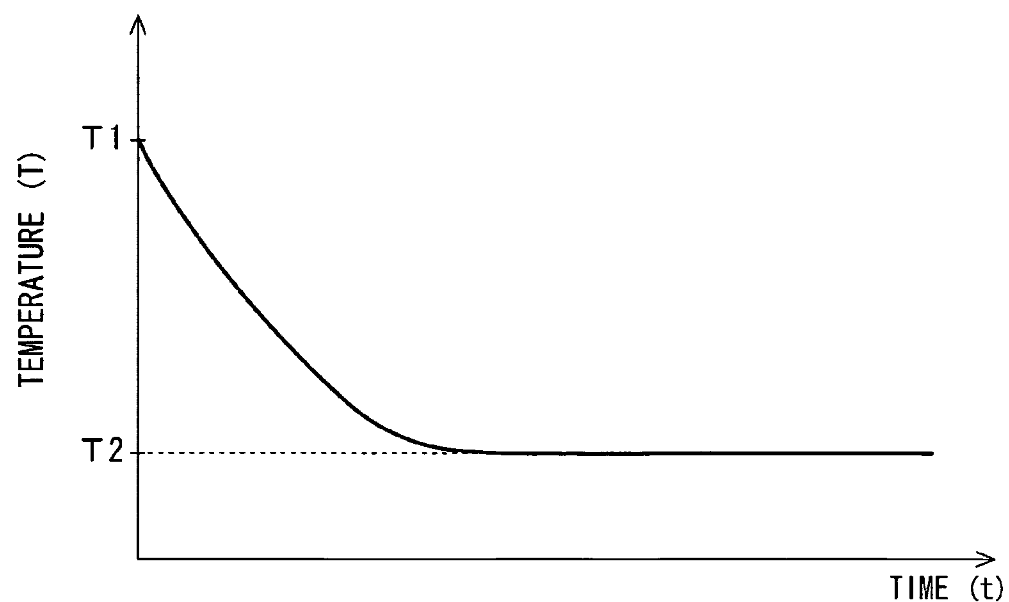

Embodiment 7 of the invention will be described with reference to FIG. 21. When the temperature of the heat insulating housing reduces from $T_1$ to $T_2$ due to heat radiation, as shown in FIG. 21A ($T_1>T_2$), in many cases the temperature T in the housing is approximated by an exponential function curve, as shown by the following equation and in FIG. 21B:

$$T=T_2-(T_2-T_1)e^{-At}$$

where A is a constant. Accordingly, an exponential function curve may be used as the target temperature curve in pull down cooling and control-cooling. The operation of embodiment 7 is similar to that of embodiment 2.

Embodiment 8

Figure 22:
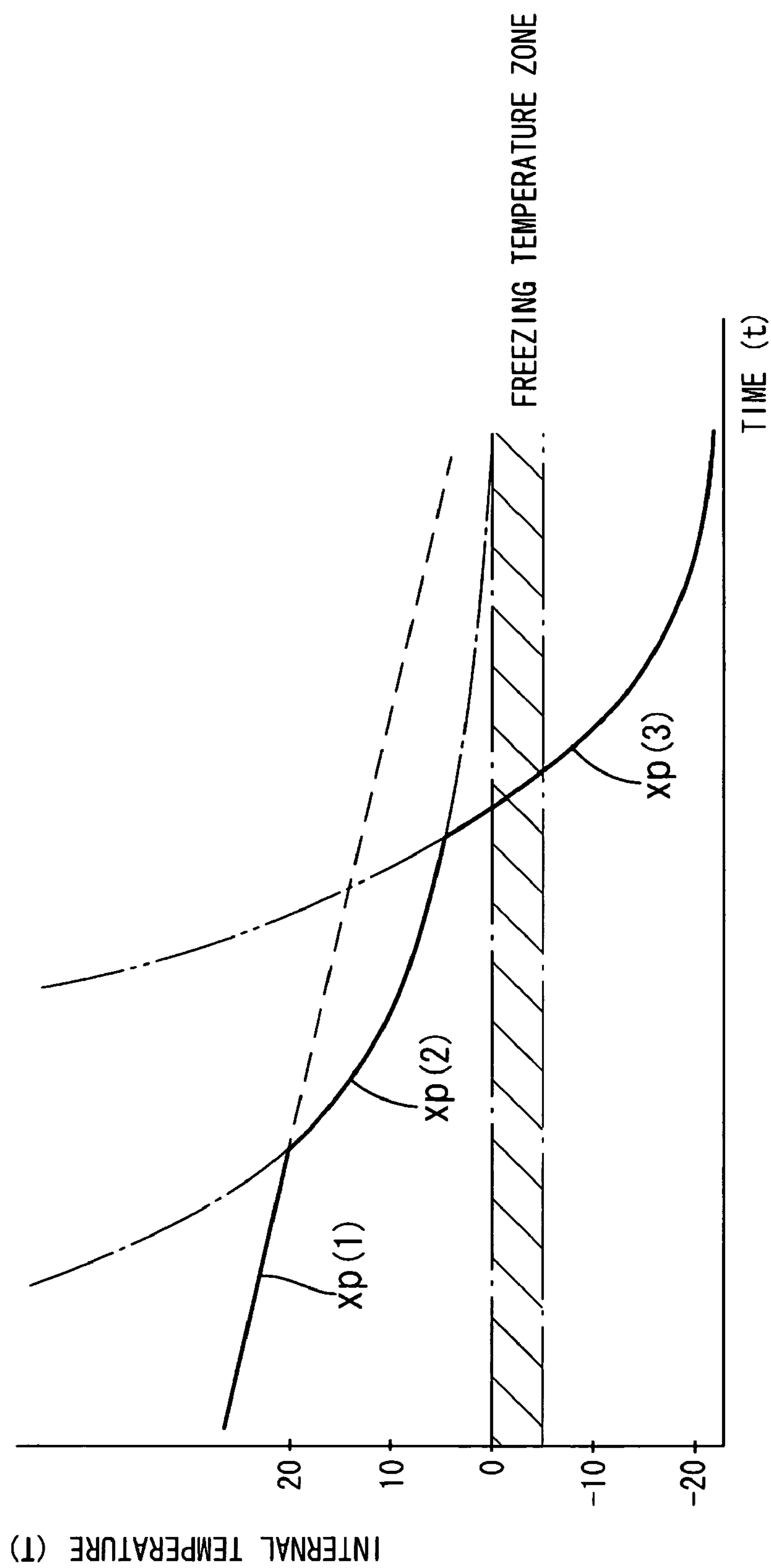
FIG. 22 A graph showing a cooling control manner in embodiment 8.

FIG. 22 illustrates embodiment 8 of the invention. Embodiment 8 shows another control example in pull down cooling. In short, a plurality of target temperature curves in pull down cooling is stored. An optimum temperature curve is selected according to the changes in the internal temperature. The control is performed so as to follow the temperature curve.

For example, in a case where pull down cooling is performed for a freezer when the internal temperature is high (at or above 20° C., for example) and the freezer is heavily loaded, it is accordingly proper to apply a temperature curve xp(1) with a gentle temperature drop. When the internal temperature has dropped to some extent, it is then desirable to follow a temperature curve xp(2) with a larger temperature drop, since the food material should be prevented from deterioration by rapid cooling. In addition, for the freezing temperature zone in the freezer (particularly, in the range from 0° C. to −5° C.), it is known that the quality of frozen foods, such as meat or fish, is improved when the freezing temperature zone (0° C. to −5° C.) is traversed as early as possible. In this zone, the evaporating temperature (low pressure) is also reduced. As a result, the operation of the inverter compressor at high speeds does not result in heavy loads. Consequently, it is preferable to select a temperature curve xp(3) with an even larger temperature drop for the zone.

Therefore, a plurality of target cooling characteristics is provided in pull down cooling. A suitable one of the target cooling characteristics is selected according to the temperature zone in the interior. Therefore, optimum temperature control is possible over the entire zone of pull down cooling.

Embodiment 9

Figure 23:
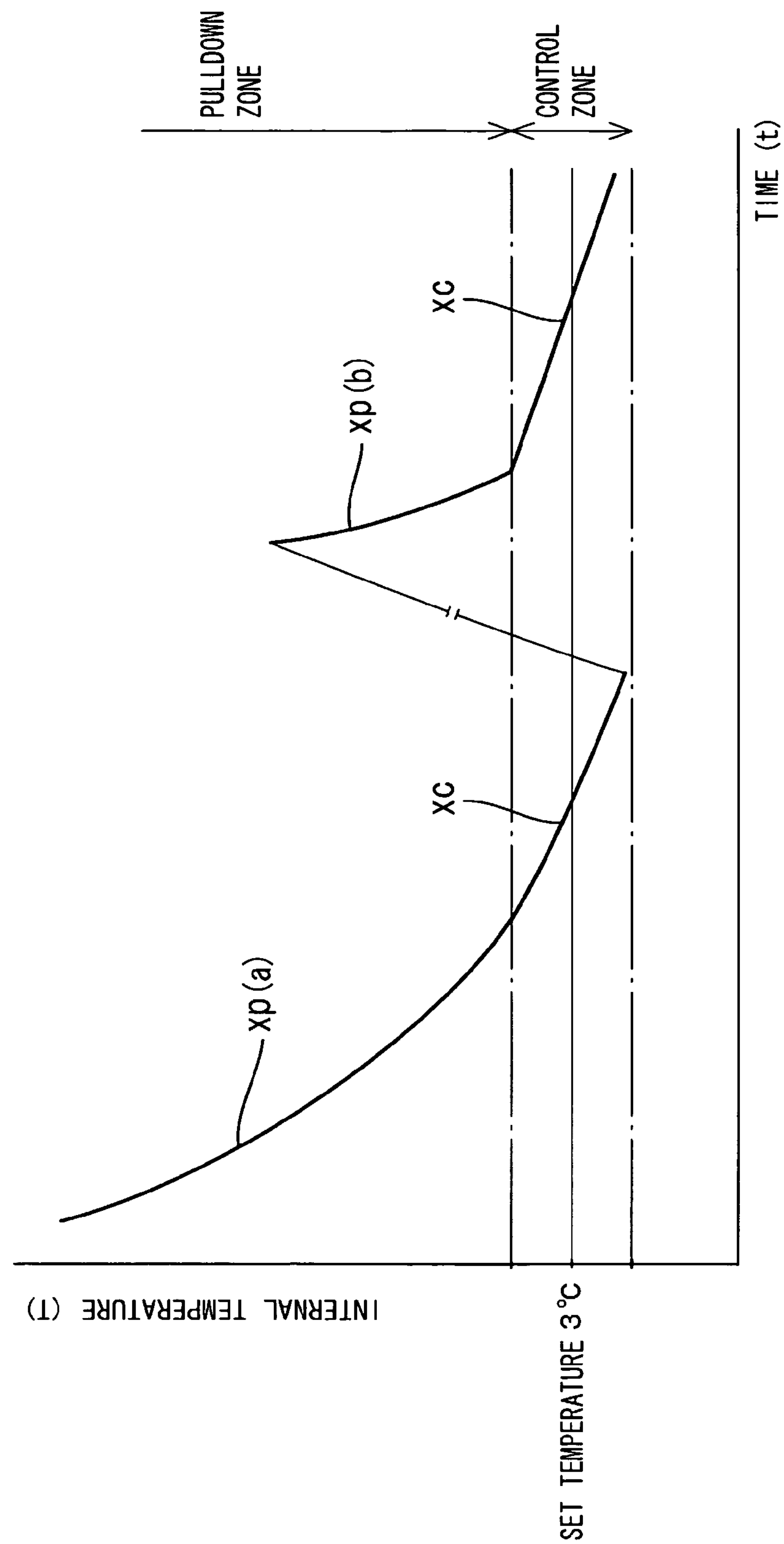
FIG. 23 A graph showing a cooling control manner in embodiment 9.

FIG. 23 illustrates embodiment 9 of the invention. In embodiment 9, a plurality of target cooling characteristics is also provided in pull down cooling. One temperature curve is selected on the basis of the difference between the set internal temperature and the current internal temperature. An effective use is as a returning means against a transient temperature rise in control-cooling.

For example, during operation in the control refrigeration zone, the door is frequently opened and closed or warm food is placed within the refrigerating storage cabinet. Consequently, the internal temperature rises to a large degree. In this case, the refrigerating storage cabinet proceeds from the control-cooling zone to the pull down cooling zone, for example, in embodiment 1. As a result, since the target temperature curve is also changed to a curve with a large temperature drop (xp), the operation usually restores the internal temperature.

However, when the door is opened and closed excessively per unit of time or the amount of food material placed within the freezer is excessively large, or the temperature of the food material is high, the internal temperature, which may be sufficiently higher than the set temperature (3° C.), for example, such as 10° C. (difference is 7° C.), is unsuitable for the storage of food material.

Accordingly, as shown in FIG. 23, when the internal temperature has reached a value 7° C. higher than the set internal temperature (3° C.), the normal temperature curve xp(a) for pull down cooling is changed to a temperature curve xp(b), having a temperature drop degree of 1.5 to 3 times greater than the normal curve. The operation is controlled so as to follow the temperature curve xp(b). As a result, the internal temperature can quickly be restored.

In this case, when the internal temperature has been restored and reaches the control-cooling zone, the temperature curve is again reverted to the control-cooling temperature curve xc. Additionally, the temperature curve xp(b), with a higher temperature drop degree, is canceled.

Therefore, the above is effective when a rapid temperature return is performed in the case where the internal temperature has shifted by a large extent from the control-cooling zone.

Embodiment 10

Figure 24:
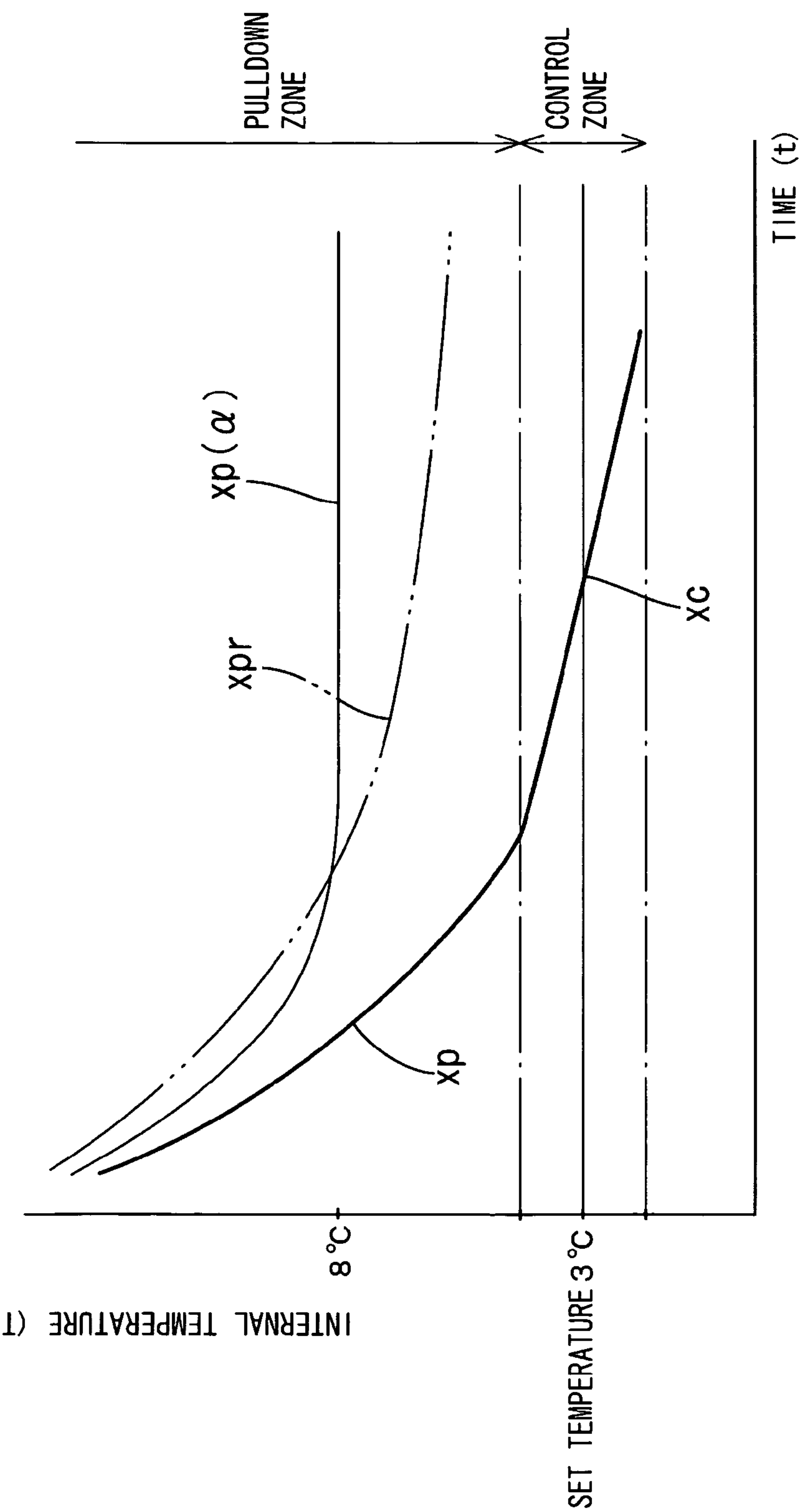
FIG. 24 A graph showing a cooling control manner in embodiment 10.

Embodiment 10 of the invention will be described with reference to FIG. 24. The heat-exchange characteristic of an evaporator 36 is reduced when a large amount of frost is attached to the evaporator 36 in the refrigerating storage cabinet of this type. When the operation is continued following a target cooling characteristic (temperature curve) xp or xc while the evaporator 36 is frosted, the rotational speed of the inverter compressor 32 needs to be increased so that the evaporating temperature is decreased. Thereby, the difference is increased between the internal temperature and the evaporating temperature. However, this results in a waste of electric power even though the internal temperature and the internal temperature drop can be maintained.

Accordingly, when the difference between the internal temperature and the evaporating temperature exceeds a predetermined value, for example, 17° C. (normally, about 10° C.), the temperature curve to be followed is changed to a temperature curve xp(a), as shown in FIG. 24. In addition, the control is executed so that the internal temperature becomes slightly higher than the set temperature. For example, an internal temperature of 8° C., which is 5° C. higher than the set temperature of 3° C., may be maintained by the temperature curve.

In short, the intention is to achieve energy savings without excessive cooling of the interior and at the same time prevent frost formation.

The defrosting operation may be forced when the difference between the internal temperature and the evaporating temperature exceeds a predetermined value (17° C.)

Furthermore, the above-described temperature curve xp(α) may be used as the target temperature curve in an emergency evacuation. For example, the maximum rotational speed of the inverter compressor 32 is not maintained, but instead a gentler temperature curve xp(α) is selected in an emergency evacuation. This happens when cooling along the target temperature curve xp or xc cannot be performed for the reason that the original cooling performance is insufficient against the load, the evaporator 36 is frosted, or refrigerant leaks (the actual cooling state is shown by the temperature curve xpr in the figure). After the lapse of a predetermined time, the temperature curve xp or xc is re-selected. When the temperature curve cannot be followed at this time, the refrigerator may be used to deliver a failure diagnosis signal.

<Related Technique>

Figure 25:
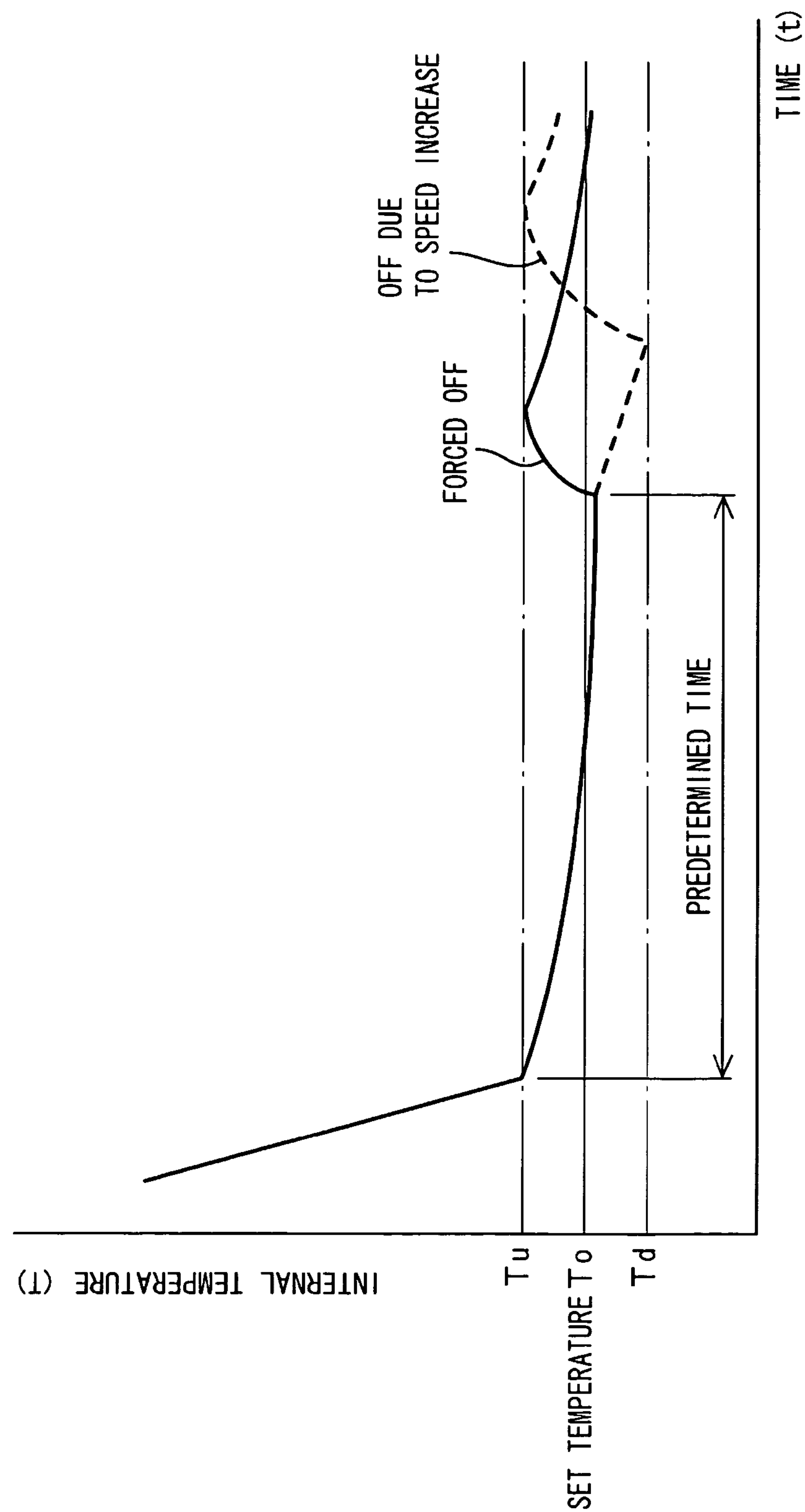
FIG. 25 A graph showing temperature changes in the control-cooling zone in a related art.
Figure 26:
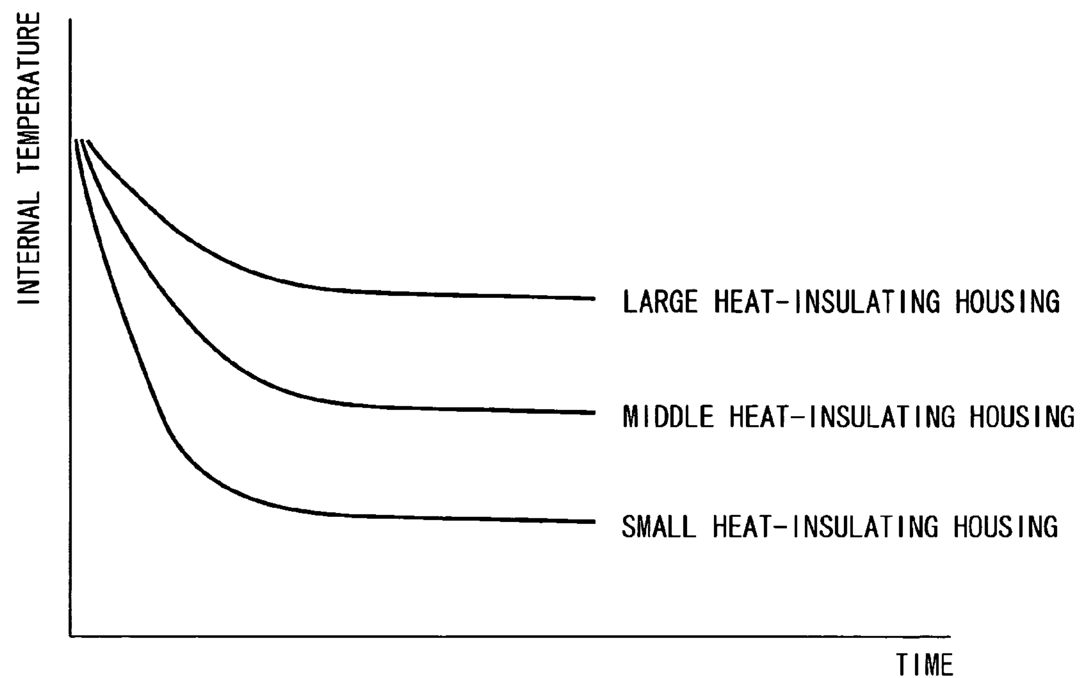
FIG. 26 A graph showing temperature curves in the pull down cooling zone in the prior art.

The following control may be executed so that energy savings is realized by taking advantage of using the inverter compressor 32 in control-cooling and then providing an OFF time. As shown by the solid line graph in FIG. 25, the inverter compressor is turned off when a timer measures a predetermined ON time of the inverter compressor 32.

Furthermore, as shown by the broken line graph in this figure, the rotational speed of the inverter compressor 32 may be increased when a timer measures a predetermined ON time of the inverter compressor 32. As a result, the internal temperature is forced to decrease to the lower limit temperature Td, whereby the inverter compressor 32 is turned off. In this case, since the internal temperature is decreased once to the lower limit temperature, the OFF time of the inverter compressor 32 is rendered relatively long as compared with a forced turn-off.

Other Embodiments (1) A time-varying mode of internal temperature is exemplified as a cooling characteristic to be followed in the foregoing embodiments. However, a measure or standard may be used on the side of the refrigeration unit, for example, the low pressure of the refrigerant or the time-varying mode of the evaporating temperature.

(2) In the foregoing embodiments, the inverter compressor is used as a means for adjusting the refrigerating performance of the refrigeration unit. The means should not be limited to the above. A compressor having multiple numbers of cylinders and an unload function in which the number of driven cylinders is adjusted according to the load, and other variable capacity type compressors may be used.

(3) The present invention should not be limited to the case where the refrigeration unit is common to refrigeration and freezing. The present invention may be applied to a case where the refrigeration unit is dedicated to refrigeration or freezing. A desired pull down cooling can be performed in the individual refrigerating storage cabinets.

(4) Furthermore, a refrigerating apparatus may not be unitized. A compressor, evaporator, or the like, may be attached to the refrigerating apparatus.

The invention claimed is:

1. A refrigerating storage cabinet comprising:

a refrigeration unit for refrigerating an inner atmosphere, the refrigeration unit having a speed-controllable inverter compressor and an evaporator, the compressor having a plurality of performance levels;

a temperature sensor configured to detect a current temperature of the inner atmosphere at predetermined intervals of operating time; and an operation control unit configured to control the inverter compressor by selecting one of the plurality of performance levels based on the current temperature, the operation control unit including:

a temperature change computing section configured to compute a current temperature reduction degree at the predetermined intervals of operating time, based on the current temperature and a previously detected temperature;

a target temperature reduction degree output section configured to obtain a target temperature reduction degree associated with the current temperature;

a comparing section configured to compare the current temperature reduction degree to the target reduction degree; and a compressor control section configured to select one of the plurality of performance levels based on a result of the comparison made by the comparing section, the operation control unit being configured to control the inverter compressor so that a rotational speed of the inverter compressor is increased when the comparing section indicates that the current temperature reduction degree is smaller than the target temperature reduction degree and the rotational speed of the inverter compressor is decreased when the comparing section indicates that the current temperature reduction degree is larger than the target temperature reduction degree, the refrigerating storage cabinet further comprising a storing unit configured to store a reference table having a plurality of target temperature reduction degrees associated with a plurality of temperatures individually representing a temperature of the inner atmosphere, wherein the plurality of target temperature reduction degrees is predetermined according to an ideal cooling characteristic that indicates a target temperature as a function of operating time, the target temperature decreasing gradually with a lapse of operating time according to the ideal cooling characteristic; and the target temperature reduction degree output section obtains the target temperature reduction degree by retrieving a target temperature reduction degree associated with the current from the reference table, and the ideal cooling characteristic includes a pull down characteristic for a temperature range from above a predetermined high temperature to near a set temperature; and the predetermined high temperature is set to be higher than the set temperature by a value larger than a predetermined value; and the pull down characteristic includes a first pull down zone and a second pull down zone;

the pull down characteristic includes a pull down characteristic that is provided for the first pull down zone and is a linear function; and the pull down characteristic includes a pull down characteristic that is provided for the second pull down zone and is a quadratic function.

2. A refrigerating storage cabinet according to claim 1, wherein:

the pull down characteristic is a linear function; and the reference table includes target temperature reduction degrees, which are predetermined according to the pull down characteristic and have a constant value.

3. A refrigerating storage cabinet according to claim 1, wherein the pull down characteristic is a quadratic function.

4. A refrigerating storage cabinet according to claim 1, wherein the pull down characteristic is an exponential function.

5. A refrigerating storage cabinet according to claim 1, wherein:

the ideal cooling characteristic includes an upper limit temperature that is higher by the predetermined value than the set temperature, a lower limit temperature that is lower by the predetermined value than the set temperature, and a control-cooling characteristic for a control-cooling zone between and including the upper limit temperature and the lower limit temperature;

when the current temperature reaches the lower limit temperature from a temperature higher than the lower limit temperature, the compressor is turned off by the operation control unit; and when the current temperature reaches the upper limit temperature from a temperature lower than the upper limit temperature, the compressor is turned on by the operation control unit.

6. A refrigerating storage cabinet according to claim 5, wherein the control-cooling characteristic is a linear function.

7. A refrigerating storage cabinet according to claim 5, wherein the control-cooling characteristic is a quadratic function.

8. A refrigerating storage cabinet according to claim 5, wherein the control-cooling characteristic is an exponential function.

9. A refrigerating storage cabinet according to claim 1, wherein the ideal cooling characteristic includes a plurality of cooling characteristics, which are individually provided for different zones of the temperature of the inner atmosphere.

10. A refrigerating storage cabinet according to claim 1, wherein the pull down characteristic includes a plurality of pull down characteristics, which are individually provided for different zones of the temperature of the inner atmosphere.

11. A refrigerating storage cabinet according to claim 10, wherein:

the plurality of pull down characteristics include a first pull down characteristic and a second pull down characteristic;

the target temperature decreases with a first temperature drop degree and with a lapse of operating time, according to the first pull down characteristic;

the target temperature decreases with a second temperature drop degree and with a lapse of operating time, according to the second pull down characteristic;

the first temperature drop degree is set to be smaller than the second temperature drop degree; and the target temperature reduction degree output section obtains the first temperature drop degree as the target temperature reduction degree when a difference between the current temperature and the set temperature is less than a predetermined amount, and obtains the second temperature drop degree as the target temperature reduction degree when the difference between the current temperature and the set temperature is greater than or equal to the predetermined amount.

12. A refrigerating storage cabinet according to claim 10, wherein:

the plurality of pull down characteristics includes an auxiliary cooling characteristic having a temperature curve that converges at a temperature higher by an auxiliary predetermined value than the set temperature; and the target temperature reduction degree output section determines the target temperature reduction degree according to the auxiliary cooling characteristic when a difference between the current temperature and an evaporation temperature of the evaporator is at or above a predetermined auxiliary temperature value.

* * * * *